United States Patent
Tang et al.

(10) Patent No.: US 10,785,635 B2
(45) Date of Patent: Sep. 22, 2020

(54) SESSION MANAGEMENT METHOD, APPARATUS, AND SYSTEM

(71) Applicant: Huawei Technologies Co., Ltd., Shenzhen (CN)

(72) Inventors: Tingfang Tang, Shenzhen (CN); Yan Li, Beijing (CN); Hui Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/688,082

(22) Filed: Nov. 19, 2019

(65) Prior Publication Data

US 2020/0100095 A1 Mar. 26, 2020

Related U.S. Application Data

(63) Continuation of application No. PCT/CN2018/090497, filed on Jun. 8, 2018.

(30) Foreign Application Priority Data

Jun. 20, 2017 (CN) .......................... 2017 1 0471836

(51) Int. Cl.
| | |
|---|---|
| H04W 4/00 | (2018.01) |
| H04W 8/12 | (2009.01) |
| H04W 4/021 | (2018.01) |
| H04W 4/02 | (2018.01) |
| H04W 48/16 | (2009.01) |
| H04W 80/10 | (2009.01) |

(52) U.S. Cl.
CPC .............. *H04W 8/12* (2013.01); *H04W 4/021* (2013.01); *H04W 4/025* (2013.01); *H04W 48/16* (2013.01); *H04W 80/10* (2013.01)

(58) Field of Classification Search
CPC ....... H04W 8/12; H04W 4/021; H04W 48/16; H04W 4/025; H04W 80/10
USPC ....................................... 455/432.1; 370/338
See application file for complete search history.

(56) References Cited

U.S. PATENT DOCUMENTS

2018/0279397 A1* 9/2018 Faccin .................. H04W 76/11

FOREIGN PATENT DOCUMENTS

| CN | 101499966 A | 8/2009 |
|---|---|---|
| CN | 101998670 A | 3/2011 |
| CN | 103229534 B | 1/2016 |

OTHER PUBLICATIONS

Machine Translation and Abstract of Chinese Publication No. CN101499966, Aug. 5, 2009, 21 pages.

(Continued)

*Primary Examiner* — Marcos Batista
(74) *Attorney, Agent, or Firm* — Conley Rose, P.C.

(57) ABSTRACT

A communication method and apparatus, where the method includes: a session management network element sending location area information; a mobility management network element receiving the location area information from the session management network element; obtaining location information of a terminal; determining, based on the location area information and the location information, that the terminal is located outside a service area indicated by the location area information; and in response to the determination, sending, to the session management network element, a message for triggering update of a session management information.

20 Claims, 17 Drawing Sheets

(56) References Cited

OTHER PUBLICATIONS

Machine Translation and Abstract of Chinese Publication No. CN101998670, Mar. 30, 2011, 30 pages.
Machine Translation and Abstract of Chinese Publication No. CN103229534, Jan. 27, 2016, 31 pages.
Qualcomm Incorporated, "23.501—AMF-SMF implications of optimal UPF placement," SA WG2 Meeting #S2-120, S2-171714(revision of S2-170xxx), Mar. 27-31, 2017, Busan, South Korea, 6 pages.
Huawei, et al., "TS 23.502: Update of Xn based inter NG RAN handover without user plane function relocation in 4.9.1.1," SA WG2 Meeting #S2-120, S2-172092 (Revision of S2-xxxxxx), Mar. 27-31, 2017, Busan, South Korea, 5 pages.
Huawei, "TS 23.501: Mobility area change event subscription," 3GPP TSG SA WG2 Meeting #121, S2-173136, May 15-19, 2017, Hangzhou, China, 3 pages.
Nokia, "TS 23.502: Handover procedure correction for UPF relocation," SA WG2 Meeting #121, S2-173155 (was S2-17xxxx), May 15-19, 2017, Hangzhou, China, 10 pages.
Huawei, et al., "TS 23.502: UPF releocation procedure when UE in CM-IDLE," SA WG2 Meeting #121, S2-173297, May 15-19, 2017, Hangzhou, China, 5 pages.
LG Electronics, et al., "TS 23.501: PDU session anchor relocation in CM-IDLE," SA WG2 Meeting #121, S2-173385 (revision of S2-17xxxx), May 15-19, 2017, Hangzhou, China, 4 pages.
3GPP TS 23501, V1.0.0, "3rd Generation Partnership Project; Technical Specification Group Services and System Aspects; System Architecture for the 5G System; Stage 2 (Release 15)," Jun. 2017, 146 pages.
3GPP TS 23502 V0.4.0, "3rd Generation Partnership Project; Technical Specification Group Services and System Aspects; Procedures for the 5G System; Stage 2 (Release 15)," May 2017, 126 pages.
3GPP TS 38.413, V0.1.0, "3rd Generation Partnership Project; Technical Specification Group Radio Access Network; NG Radio Access Network (NG-RAN); NG Application Protocol (NGAP) (Release 15)," May 2017, 80 pages.
Foreign Communication From a Counterpart Application, Chinese Application No. 201710471836.3, Chinese Office Action dated Nov. 28, 2019, 10 pages.
Foreign Communication From a Counterpart Application, PCT Application No. PCT/CN2018/090497, English Translation of International Search Report dated Jul. 31, 2018, 3 pages.
Foreign Communication From a Counterpart Application, PCT Application No. PCT/CN2018/090497, English Translation of Written Opinion dated Jul. 31, 2018, 5 pages.
Huawei, et al., "Pseudo CR on TS 23.502 for the NF Services and Service Operations of AMF," SA WG2 Meeting #121, S2-173992, XP051289468, May 15-19, 2017, Hangzhou, China, 14 pages.
Huawei, et al., "TS 23.502: UPF relocation procedure when UE in CM-IDLE," SA WG2 Meeting #121, S2-174072, XP051289539, May 15-19, 2017, Hangzhou, China, 5 pages.
Huawei, et al., "Pseudo CR on TS 23.502 for updating service request procedures with NF service operation invocations," SA WG2 Meeting #122, S2-174162, XP051309252, Jun. 26-30, 2017, San Jose Del Cabo, Mexico, 14 pages.
Qualcomm Incorporated, et al., "TS 23.502: PDU sessions handling for LADNs," SA WG2 Meeting #121, S2-173111, XP051281617, May 15-19, 2017, Hangzhou, P.R. China, 34 pages.

\* cited by examiner

SESSION MANAGEMENT METHOD, APPARATUS, AND SYSTEM

CROSS-REFERENCE TO RELATED APPLICATIONS

This application is a continuation of International Patent Application No. PCT/CN2018/090497, filed on Jun. 8, 2018, which claims priority to Chinese Patent Application No. 201710471836.3, filed on Jun. 20, 2017. The disclosures of the aforementioned applications are hereby incorporated by reference in their entireties.

TECHNICAL HELD

This application relates to the field of information technologies, and in particular, to a communication method and apparatus.

BACKGROUND

In a Long Term Evolution (LTE) system, tracking area identities (TAI) in a tracking area list (TAList) allocated by a mobility management entity (MME) to a terminal belong to a service area of a same serving gateway (SGW). Correspondingly, in a $5^{th}$ Generation (5G) system, an access and mobility management function (AMF) entity allocates a registration area list to a terminal. The AMF entity selects an appropriate session management function (SMF) entity for a session. In addition, each SMF entity is connected to at least one user plane function (UPF).

When a session is deactivated, a radio access network (RAN) resource of the session is released, and an N3 interface connection between a UPF and a RAN of the session is released. If a terminal has moved out of a service area of a UPF serving the terminal, when the UPF receives initial downlink data for the terminal, a network side needs to first page the terminal within a registration area range, then allocate a RAN resource to the terminal to establish a connection to the RAN side, and restore the N3 interface connection between the UPF and the radio access network. Because the terminal has moved to a service area of another UPF, in this case, the terminal is unable to connect to the UPF that served the terminal, and therefore cannot receive the initial downlink data. Consequently, the initial downlink data fails to be sent, and a related service fails to be set up.

In conclusion, how to avoid a failure in sending downlink data to a terminal when a UPF of the terminal is changed is a problem that urgently needs to be resolved.

SUMMARY

This application provides a communication method and apparatus, in order to avoid a failure in sending downlink data to a terminal when a UPF of the terminal is changed.

An embodiment of this application provides a communication method. The method includes: receiving, by an access-network network element, tunnel information of a first session from a mobility management network element, where the tunnel information is information about a tunnel between the access-network network element and a first user plane network element that receives downlink data for a terminal; determining, by the access-network network element, that the tunnel information is invalid; and sending first information to a session management network element, where the first information indicates that the tunnel information is invalid.

According to the foregoing method, the access-network network element determines whether the received tunnel information is valid, and after determining that the tunnel information is invalid, notifies the session management network element that the tunnel information is invalid. In this way, the session management network element can determine, in a timely manner, that the tunnel information is invalid, in order to ensure that a service of the terminal can be set up in a timely and effective manner, while avoiding a service setup failure caused by service setup performed based on the invalid tunnel information.

Optionally, determining, by the access-network network element, that the tunnel information is invalid includes: when determining that the access-network network element is unable to connect to the first user plane network element corresponding to the tunnel information, determining, by the access-network network element, that the tunnel information is invalid.

An embodiment of this application provides a communication method. The method includes: receiving, by a session management network element, first information from an access-network network element, where the first information indicates that tunnel information of a first session is invalid, and the tunnel information is information about a tunnel between the access-network network element and a first user plane network element that receives downlink data for a terminal; and updating, by the session management network element, the tunnel information of the first session after receiving the first information.

According to the foregoing method, the session management network element can determine, based on the first message and in a timely manner, that the tunnel information of the first session is invalid, in order to avoid a service setup failure caused by service setup performed based on the invalid tunnel information.

Optionally, the first information includes an identifier of the first session and a cause value, the first session is associated with the tunnel, and the cause value indicates that the tunnel information is invalid.

An embodiment of this application provides a communication method. The method includes: receiving, by a mobility management network element, session management information and location area information from a session management network element; determining location information of a terminal; determining, by the mobility management network element based on the location area information and the location information, that the terminal is located outside a service area indicated by the location area information; notifying the session management network element that the session management information is not forwarded; and triggering the session management network element to update the session management information.

According to the foregoing method, when determining, based on the location area information and the location information, that the terminal is located outside the service area indicated by the location area information, the mobility management network element may instruct the session management network element to update the session management information. This can ensure that a service of the terminal can be set up in a timely and effective manner, and avoid a service setup failure caused when the terminal is located in a service area of another user plane network element.

Optionally, notifying, by the mobility management network element, the session management network element that the session management information is not forwarded, and triggering the session management network element to update the session management information includes: sending, by the mobility management network element, a first message to the session management network element, where the first message indicates that the session management information is not forwarded; and triggering the session management network element to update the session management information.

An embodiment of this application provides a communication method. The method includes: sending, by a session management network element, session management information and location area information to a mobility management network element; learning, by the session management network element from the mobility management network element, that the session management information is not forwarded, where that the session management information is not forwarded is associated with the location area information and location information of a terminal; and updating, by the session management network element, the session management information.

According to the foregoing method, the session management network element may update the session management information after learning, from the mobility management network element, that the session management information is not forwarded. This can ensure that the terminal sets up a service based on latest session management information, and avoid a service setup failure of the terminal.

Optionally, learning, by the session management network element from the mobility management network element, that the session management information is to be updated includes receiving, by the session management network element, a first message from the mobility management network element, where the first message indicates an update of the session management information.

Optionally, the first message further includes a cause value, and the cause value indicates that the session management information is not forwarded or the session management information needs to be updated.

Optionally, the first message further includes the location information.

Optionally, the location area information includes service area information of a first user plane network element that receives downlink data for the terminal.

Optionally, updated session management information includes information about a second user plane network element for transmitting data to the terminal.

An embodiment of this application provides a communication method. The method includes: receiving, by a mobility management network element, session management information and condition information from a session management network element; determining status information of a terminal; and forwarding, by the mobility management network element, the session management information if the mobility management network element determines that the status information of the terminal meets the condition information.

According to the foregoing method, when determining that location information of the terminal does not meet location area condition information, the mobility management network element sends, to the session management network element, a first message that is used to trigger the session management network element to update the session management information. This can ensure that a service of the terminal can be set up in a timely and effective manner, and avoid a service setup failure caused when the terminal is located in a service area of another user plane network element.

Optionally, the status information of the terminal is the location information of the terminal, and the condition information includes location area information.

Optionally, the status information of the terminal is a status of the terminal, and the condition information includes: the status of the terminal is a connected state.

Optionally, the method further includes: if the mobility management network element determines that the status information of the terminal does not meet the condition information, instructing, by the mobility management network element, the session management network element to update the session management information.

An embodiment of this application provides a communication method. The method includes sending, by a session management network element, session management information and condition information to a mobility management network element, where forwarding or updating of the session management information is associated with the condition information and status information of a terminal.

Optionally, the status information of the terminal is location information of the terminal, and the condition information includes location area information.

Optionally, the status information of the terminal is a status of the terminal, and the condition information includes: the status of the terminal is a connected state.

Optionally, the method further includes: if the mobility management network element determines that the status information of the terminal does not meet the condition information, instructing, by the mobility management network element, the session management network element to update the session management information.

An embodiment of this application provides a communication method. The method includes: obtaining, by a session management network element, location information of a terminal; determining, by the session management network element based on the location information, that the terminal is located outside a service area of a user plane network element corresponding to a first session of the terminal; and determining, based on the location information of the terminal, a second user plane network element for transmitting data to the terminal.

According to the foregoing method, after obtaining the location information of the terminal, the session management network element determines, based on the location information, that the terminal is located outside the service area of the user plane network element corresponding to the first session of the terminal. In this case, the session management network element may determine that received tunnel information is invalid, in order to determine, based on the location information of the terminal, the second user plane network element for transmitting data to the terminal. This ensures that a service of the terminal can be set up in a timely and effective manner, and avoid a service setup failure caused when the terminal is located in a service area of another user plane network element.

Optionally, obtaining, by a session management network element, location information of a terminal includes: after receiving a downlink data notification message, requesting, by the session management network element, the location information of the terminal from a mobility management network element; and receiving, by the session management network element, the location information of the terminal from the mobility management network element. Additionally, determining, by the session management network element based on at least one of a mobility attribute and the location information, that the terminal is located outside a service area of a first user plane network element corresponding to a first session of the terminal includes determining, by the session management network element based on the location information received from the mobility management network element, that the terminal is located outside the service area of the first user plane network element corresponding to the first session of the terminal.

Optionally, after determining, by the session management network element based on the location information of the terminal, a second user plane network element for transmitting data to the terminal, the method further includes sending, by the session management network element to the mobility management network element, session management information that includes second tunnel information corresponding to the second user plane network element.

An embodiment of this application provides a communication method. The method includes: receiving, by a mobility management network element, a first message from a session management network element, where the first message does not carry session management information, and the first message is used to request location information of a terminal; receiving, by the mobility management network element, a paging response that includes the location information; and sending the location information to the session management network element based on the first message.

An embodiment of this application provides a communications apparatus. The apparatus includes: a transceiver unit configured to receive tunnel information of a first session from a mobility management network element, where the tunnel information is information about a tunnel between an access-network network element and a first user plane network element that receives downlink data for a terminal; and a processing unit configured to determine that the tunnel information is invalid, and send first information to a session management network element, where the first information indicates that the tunnel information is invalid.

Optionally, the processing unit is configured such that when determining that the access-network network element is unable to connect to the first user plane network element corresponding to the tunnel information, the processing unit determines that the tunnel information is invalid.

An embodiment of this application provides a communications apparatus. The apparatus includes: a transceiver unit configured to receive first information from an access-network network element, where the first information indicates that tunnel information of a first session is invalid, and the tunnel information is information about a tunnel between the access-network network element and a first user plane network element that receives downlink data for a terminal; and a processing unit configured to update the tunnel information of the first session after the first information is received.

Optionally, the first information includes an identifier of the first session and a cause value, the first session is associated with the tunnel, and the cause value indicates that the tunnel information is invalid.

An embodiment of this application provides a communications apparatus. The apparatus includes: a transceiver unit configured to receive session management information and location area information from a session management network element, and determine location information of a terminal; and a processing unit configured to determine, based on the location area information and the location information, that the terminal is located outside a service area indicated by the location area information. The transceiver unit is further configured to: notify the session management network element that the session management information is not forwarded; and trigger the session management network element to update the session management information.

Optionally, the transceiver unit is configured to: send a first message to the session management network element, where the first message indicates that the session management information is not forwarded; and trigger the session management network element to update the session management information.

An embodiment of this application provides a communications apparatus. The apparatus includes: a transceiver unit configured to: send session management information and location area information to a mobility management network element; and learn from the mobility management network element that the session management information is not forwarded, where that the session management information is not forwarded is associated with the location area information and location information of a terminal; and a processing unit configured to update the session management information.

Optionally, the transceiver unit is configured to receive a first message from the mobility management network element, where the first message indicates an update of the session management information.

Optionally, the first message includes first information, and the first information indicates that the session management information is not forwarded or the session management information needs to be updated.

Optionally, the first message further includes the location information.

Optionally, the location area information includes service area information of a first user plane network element that receives downlink data for the terminal.

Optionally, updated session management information includes information about a second user plane network element for transmitting data to the terminal.

An embodiment of this application provides a communications apparatus. The apparatus includes: a transceiver unit configured to obtain location information of a terminal; and a processing unit configured to: determine, based on the location information, that the terminal is located outside a service area of a user plane network element corresponding to a first session of the terminal; and determine, based on the location information of the terminal, a second user plane network element for transmitting data to the terminal.

Optionally, the transceiver unit is configured to: after receiving a downlink data notification message, request the location information of the terminal from a mobility management network element; and receive, by the session management network element, the location information of the terminal from the mobility management network element. The processing unit is configured to determine, based on the location information received from the mobility management network element, that the terminal is located outside the service area of the first user plane network element corresponding to the first session of the terminal.

Optionally, the transceiver unit is further configured to send, to the mobility management network element, session management information that includes second tunnel information corresponding to the second user plane network element.

An embodiment of this application provides a communications apparatus. The apparatus includes: a transceiver configured to receive tunnel information of a first session from a mobility management network element, where the tunnel information is information about a tunnel between an access-network network element and a first user plane network element that receives downlink data for a terminal; and a processor configured to: determine that the tunnel information is invalid; and send first information to a session management network element, where the first information indicates that the tunnel information is invalid.

Optionally, the processor is configured to such that when determining that the access-network network element is unable to connect to the first user plane network element corresponding to the tunnel information, the processor determines that the tunnel information is invalid.

An embodiment of this application provides a communications apparatus. The apparatus includes: a transceiver configured to receive first information from an access-network network element, where the first information indicates that tunnel information of a first session is invalid, and the tunnel information is information about a tunnel between the access-network network element and a first user plane network element that receives downlink data for a terminal; and a processor configured to update the tunnel information of the first session after the first information is received.

Optionally, the first information includes an identifier of the first session and a cause value, the first session is associated with the tunnel, and the cause value indicates that the tunnel information is invalid.

An embodiment of this application provides a communications apparatus. The apparatus includes: a transceiver configured to: receive session management information and location area information from a session management network element; and determine location information of a terminal; and a processor configured to determine, based on the location area information and the location information, that the terminal is located outside a service area indicated by the location area information. The transceiver is further configured to: notify the session management network element that the session management information is not forwarded; and trigger the session management network element to update the session management information.

Optionally, the transceiver is configured to: send a first message to the session management network element, where the first message indicates that the session management information is not forwarded; and trigger the session management network element to update the session management information.

An embodiment of this application provides a communications apparatus. The apparatus includes: a transceiver configured to: send session management information and location area information to a mobility management network element; and learn from the mobility management network element that the session management information is not forwarded, where that the session management information is not forwarded is associated with the location area information and location information of a terminal; and a processor configured to update the session management information.

Optionally, the transceiver is configured to receive a first message from the mobility management network element, where the first message indicates an update of the session management information.

Optionally, the first message includes first information, and the first information indicates that the session management information is not forwarded or the session management information needs to be updated.

Optionally, the first message further includes the location information.

Optionally, the location area information includes service area information of a first user plane network element that receives downlink data for the terminal.

Optionally, updated session management information includes information about a second user plane network element for transmitting data to the terminal.

An embodiment of this application provides a communication apparatus. The apparatus includes: a transceiver configured to obtain location information of a terminal; and a processor configured to: determine, based on the location information, that the terminal is located outside a service area of a user plane network element corresponding to a first session of the terminal; and determine, based on the location information of the terminal, a second user plane network element for transmitting data to the terminal.

Optionally, the transceiver is configured to: after receiving a downlink data notification message, request the location information of the terminal from a mobility management network element; and receive, by the session management network element, the location information of the terminal from the mobility management network element. The processor is further configured to determine, based on the location information received from the mobility management network element, that the terminal is located outside the service area of the first user plane network element corresponding to the first session of the terminal.

Optionally, the transceiver is further configured to send, to the mobility management network element, session management information that includes second tunnel information corresponding to the second user plane network element.

An embodiment of this application provides a computer storage medium. The computer storage medium stores an instruction. When the instruction runs on a computer, the computer is enabled to perform the method in any one of the foregoing communication manners.

An embodiment of this application further provides a communications system. The system includes the communications apparatus provided in any one of the foregoing designs. Optionally, the system may further include another device that interacts with the communications apparatus in the solutions provided in the embodiments of this application.

An embodiment of this application further provides a computer program product including an instruction. When the instruction runs on a computer, the computer is enabled to perform the method in the foregoing aspects.

DESCRIPTION OF EMBODIMENTS

The following further describes this application in detail with reference to the accompanying drawings.

Embodiments of this application may be applied to various mobile communications systems, for example, a 5G system (such as a new radio (NR) system or a new-generation core network (5G CN) system) or another mobile communications system.

Figure 1:
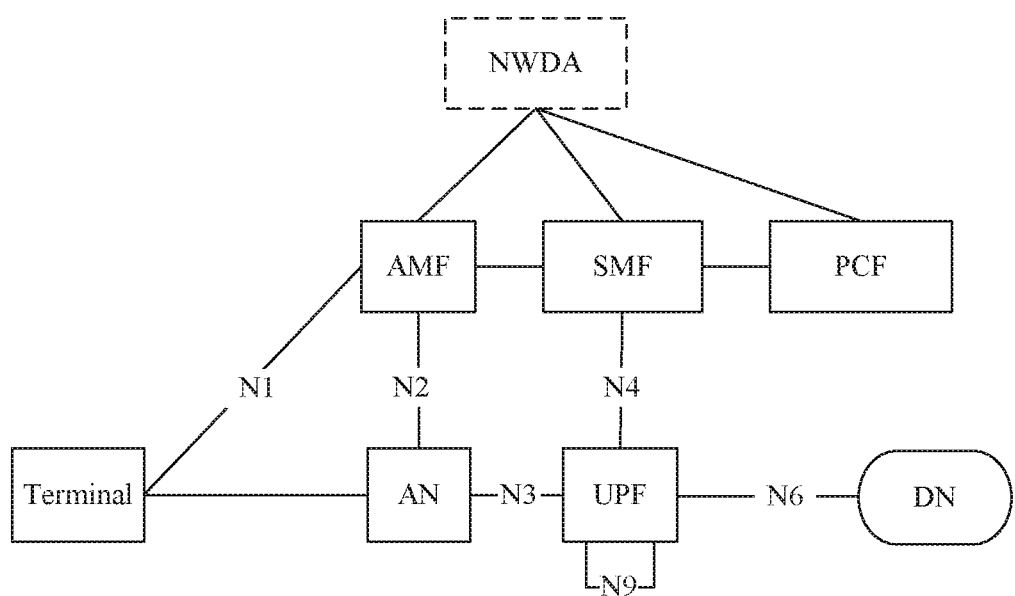
FIG. 1 is a schematic diagram of a possible 5G network architecture.

As described above, a method and an apparatus that are provided in the embodiments of this application may be applied to a 5G system. For a 5G network architecture that is currently under discussion, there are a plurality of possible architectures. As shown in FIG. 1, FIG. 1 is a schematic diagram of a possible 5G network architecture. The network architecture shown in FIG. 1 includes network elements such as a network data analysis (NWDA) device, an AMF, an SMF, a policy control function (PCF), an access network (AN) (which may include a RAN or another access network), a UPF, and a data network (DN).

The SMF is responsible for session management, Internet Protocol (IP) address allocation and management for a terminal, user plane (UP) anchor function allocation and selection, UPF and user plane path (re)selection, and the like. The AMF is responsible for access and mobility management, and is a termination point of an N2 interface (an interface between the AMF and a RAN device). The AMF implements functions such as registration management, connection management, reachability management, registration area list allocation, and mobility management, and transparently routes a session management (SM) message to the SMF. The UPF is a user plane function device, and is responsible for providing, for a terminal, services such as data packet routing and forwarding, lawful interception, buffering of a downlink data packet, and triggering of a downlink data packet notification message.

Figure 2:
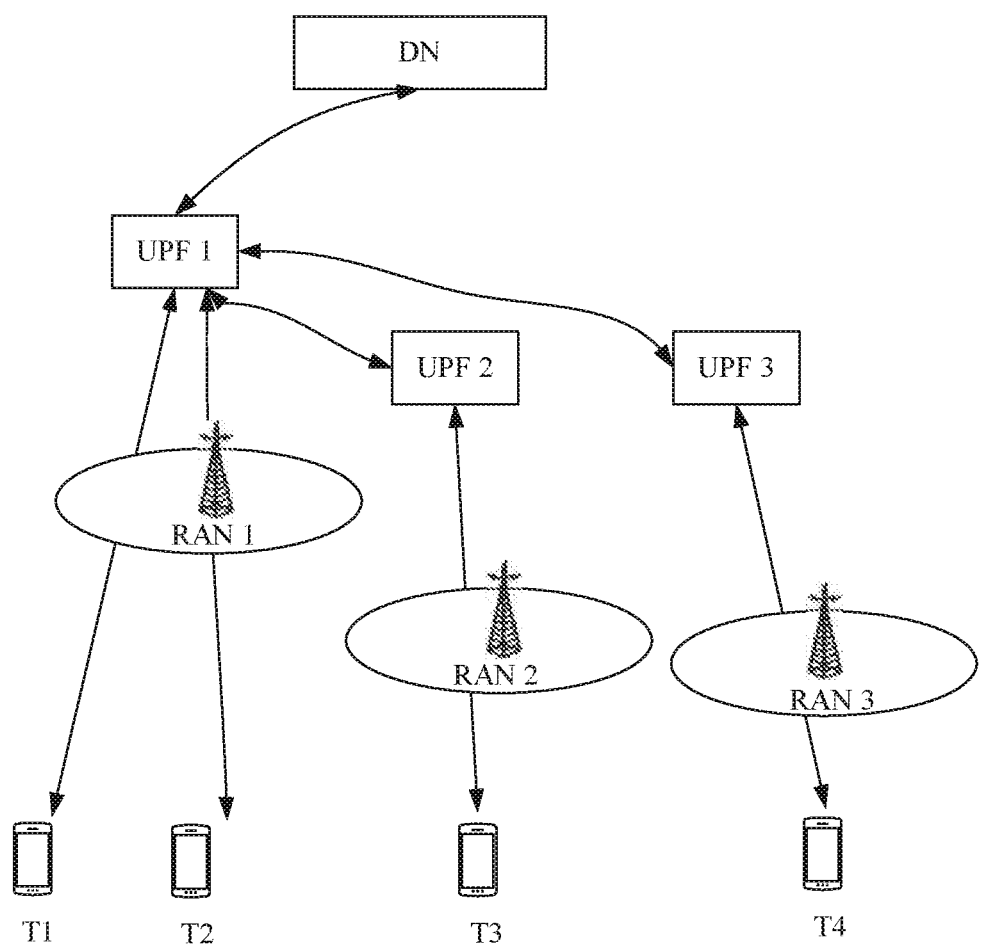
FIG. 2 is a schematic structural diagram of a network according to an embodiment of this application.

With reference to FIG. 1, as shown in FIG. 2, FIG. 2 is a schematic structural diagram of a network according to an embodiment of this application. There are three UPFs connected to a DN: a UPF 1, a UPF 2, and a UPF 3. Each UPF has a corresponding service area, and each service area includes at least one RAN. In FIG. 1, descriptions are provided using an example in which a service area of the UPF 1 includes a RAN 1, a service area of the UPF 2 includes a RAN 2, and a service area of the UPF 3 includes a RAN 3. In FIG. 1, the UPF 1 is an anchor UPF of a session, and the UPF 2 and the UPF 3 are non-anchor UPFs of the session. When a terminal establishes a session, a network side selects an appropriate UPF to serve the terminal, and allocates an IP address to the terminal. For example, at a moment T1 in the figure, when the terminal establishes a session, the network side (for example, an SMF) selects the UPF 1 to serve the terminal, and allocates an IP address to the terminal. Then, the UPF 1 anchors the IP address, and provides an N3 connection for the terminal. In this case, after downlink data for the terminal arrives at the DN, the DN forwards the downlink data to the UPF 1, and then, the UPF 1 forwards the downlink data to the terminal via the RAN 1 in the service area of the UPF 1. An uplink data transmission path of the terminal is opposite to a downlink data transmission path of the terminal. Details are not described herein.

At a moment T2, if the terminal is still within the service area of the UPF 1, a user plane path of the session of the terminal remains unchanged. In this case, uplink and downlink data transmission paths of the terminal remain unchanged.

At a moment T3, if the terminal moves to the service area of the UPF 2, the UPF 2 provides an N3 connection for data transmission of the session of the terminal, and the UPF 1 still anchors the IP address of the session, to be more specific, provides an N6 connection for the session. In this case, after the downlink data for the terminal arrives at the DN, the DN forwards the downlink data to the UPF 1, the UPF 1 forwards the downlink data to the UPF 2, and the UPF 2 forwards the downlink data to the terminal via the RAN 2 in the service area of the UPF 2. For an uplink data transmission path of the terminal, details are not described herein.

At a moment T4, if the terminal moves to the service area of the UPF 3, the UPF 3 provides an N3 connection for data transmission of the session of the terminal, and the UPF 1 still anchors the IP address of the session, to be more specific, provides an N6 connection for the session. In this case, after the downlink data for the terminal arrives at the DN, the DN forwards the downlink data to the UPF 1, the UPF 1 forwards the downlink data to the UPF 3, and the UPF 3 forwards the downlink data to the terminal via the RAN 3 in the service area of the UPF 3. For an uplink data transmission path of the terminal, details are not described herein.

In the foregoing described process, if the terminal is in an idle state, or the terminal is in a non-idle state but the session of the terminal is deactivated, when the terminal moves from the service area of the UPF 1 to the service area of the UPF 2, the network side still sends the downlink data for the terminal to the UPF 1, and consequently the terminal cannot receive the downlink data. Similarly, when the terminal moves from the service area of the UPF 2 to the service area of the UPF 3, the foregoing problem also exists. Therefore, this application provides a communication method and an apparatus to resolve the foregoing problem. The method and the apparatus are applicable to a scenario in which the terminal moves from the service area of the UPF 1 to the service area of the UPF 2, and may also be applicable to a scenario in which the terminal moves from the service area of the UPF 2 to the service area of the UPF 3. Detailed descriptions are provided below.

In addition, it should be noted that, in the embodiments of this application, a mobility management network element may be a device such as an AMF, a session management network element may be a device such as an SMF, and a user plane network element may be a device such as a UPF.

In the embodiments of this application, a terminal, also referred to as a user equipment (UE), is a device that provides voice and/or data connectivity for a user, for example, a handheld device with a wireless connection function or an in-vehicle device. Common terminals include, for example, a mobile phone, a tablet computer, a notebook computer, a palmtop computer, a mobile Internet device (MID), or a wearable device such as a smartwatch, a smart band, or a pedometer.

In the embodiments of this application, an access-network network element may be a common base station (for example, a NodeB or an eNB), may be a New Radio (NR) controller, may be a gNodeB (gNB) in a 5G system, may be a centralized network element (or centralized unit), may be a new radio base station, may be a remote radio unit, may be a micro base station, may be a relay, may be a distributed network element (or distributed unit), or may be a reception point (Transmission Reception Point (TRP)), a transmission point (TP), or any other radio access device. However, the embodiments of this application are not limited thereto.

It should be noted that, in the embodiments of this application, the access-network network element is not necessarily an entity device, but may be a virtualized network element or another entity or network element. Herein, the name "the access-network network element" is merely for ease of description. A specific name may be determined depending on an embodiment application scenario. Similarly, the mobility management network element, the session management network element, and the user plane network element are also not necessarily entity devices, and may be virtualized network elements or other entities or network elements. The foregoing names are merely for ease of description, and specific names may be determined depending on an embodiment application scenario.

Figure 3:
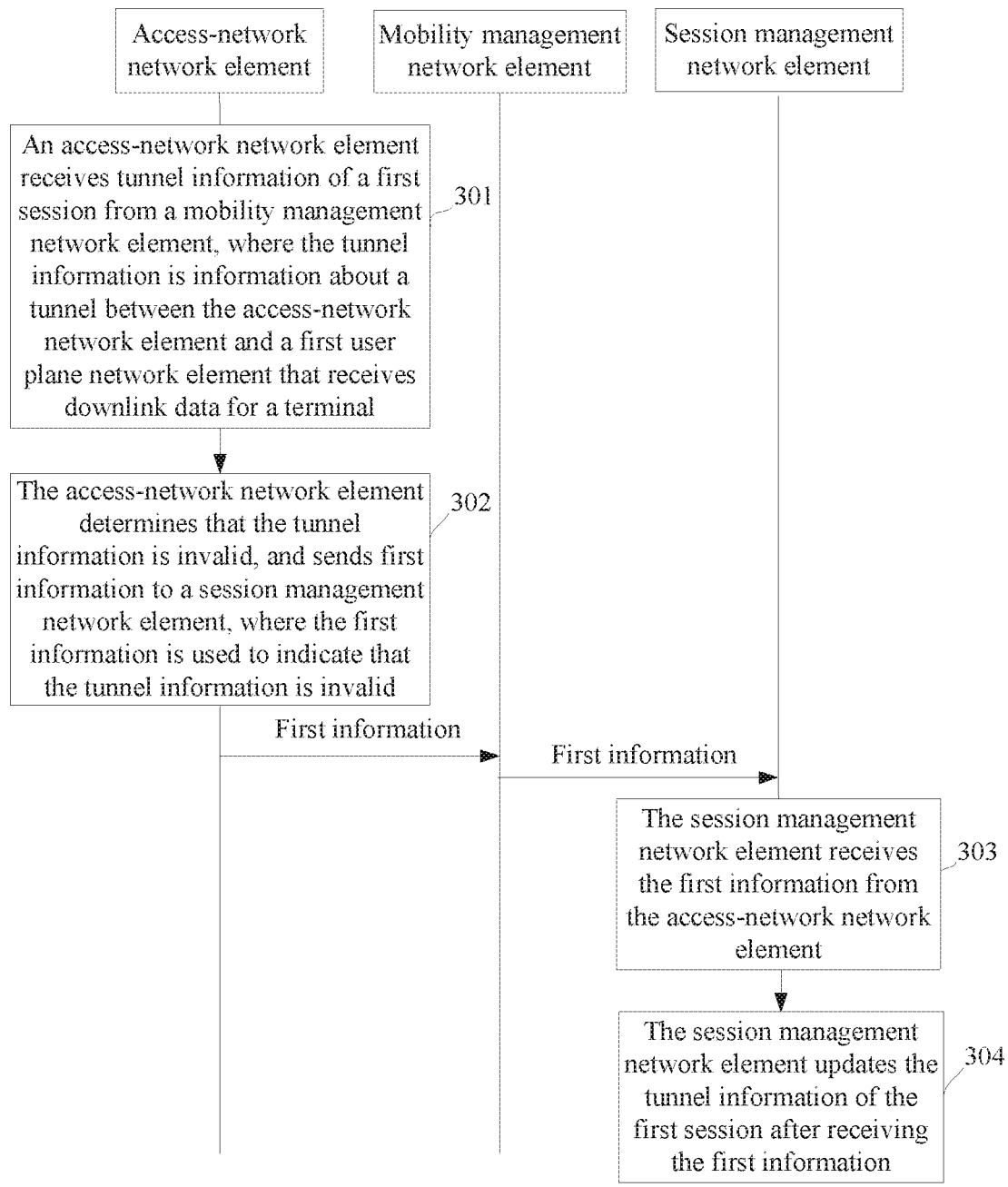
FIG. 3 is a schematic flowchart of a communication method according to an embodiment of this application.

With reference to the foregoing descriptions, FIG. 3 is a schematic flowchart of a communication method according to an embodiment of this application. The method includes the following steps.

Step 301: An access-network network element receives tunnel information of a first session from a mobility management network element, where the tunnel information is information about a tunnel between the access-network network element and a first user plane network element that receives downlink data for a terminal.

Step 302: The access-network network element determines that the tunnel information is invalid, and sends first information to a session management network element where the first information indicates that the tunnel information is invalid.

Step 303: The session management network element receives the first information from the access-network network element.

Step 304: The session management network element selects, based on the first information, a second user plane network element for transmitting data to the terminal.

According to the foregoing method, the access-network network element determines whether the received tunnel information is valid, and after determining that the tunnel information is invalid, notifies the session management network element that the tunnel information is invalid. In this way, the session management network element can determine, in a timely manner, that the tunnel information is invalid, in order to ensure that a service of the terminal can be set up in a timely and effective manner, and avoid a service setup failure caused by service setup performed based on the invalid tunnel information.

Before step 301, the terminal is in an idle state, or the terminal is in a non-idle state but the first session of the terminal is deactivated. Before the terminal is in an idle state, or before the terminal is in a non-idle state but the first session of the terminal is deactivated, a network side instructs the first user plane network element to serve the terminal. The first user plane network element may be an anchor user plane network element, for example, the UPF 1 in FIG. 2, or may be a non-anchor user plane network element, for example, the UPF 2. The non-idle state may be a connection management-connected state.

When the first user plane network element receives the downlink data for the terminal, if the terminal has moved out of a service area of the first user plane network element, the first user plane network element still informs the session management network element that the first user plane network element has received the downlink data for the terminal. Then, the session management network element sends session management information to the connected mobility management network element. Before sending the session management information, the session management network element may determine that a user plane network element corresponding to the stored tunnel information of the first session is the first user plane network element, in order to send the session management information including the tunnel information to the mobility management network element connected to the session management network element.

It should be noted that, in this embodiment of this application, the tunnel information may be Core Network (CN) N3 tunnel info, to be more specific, core network N3 tunnel information, may be (R)AN tunnel info, to be more specific, access-network network element tunnel information, or may be other information. The CN N3 tunnel info and the (R)AN tunnel info are information related to two ends of a connection between a core network and an access network. Correspondingly, the session management information may be N2 session management information or other information.

In step 301, a message that is received by the access-network network element and that includes the tunnel information of the first session may be an N2 SM message. The first session is a session between the access-network network element and the first user plane network element.

In step 302, after receiving the tunnel information of the first session, if the access-network network element determines that the access-network network element is unable to connect to the first user plane network element corresponding to the tunnel information, the access-network network element may determine that the tunnel information is invalid. Correspondingly, if the access-network network element determines that the access-network network element is able to connect to the first user plane network element corresponding to the tunnel information, the access-network network element may determine that the tunnel information is valid.

For example, the access-network network element may determine, through comparison, whether an IP address list of connectable user plane network elements that is configured in the access-network network element includes an IP address of the first user plane network element carried in the tunnel information. If the IP address list includes the IP address of the first user plane network element, the access-network network element stay determine that the access-network network element is able to connect to the first user plane network element. If the IP address list does not include the IP address of the first user plane network element, the access-network network element may determine that the access-network network element is unable to connect to the first user plane network element.

Certainly, the foregoing is merely an example. The access-network network element may alternatively determine, in another manner, whether the access-network network element can connect to the first user plane network element corresponding to the tunnel information. Details are not described herein.

After determining that the tunnel information is invalid, the access-network network element may send, to the mobility management network element, first information indicating that the tunnel information is invalid. For example, the access-network network element may send the first information to the mobility management network element using a terminal context setup response message. After receiving the first information, the mobility management network element may forward the first information to the session management network element. For example, the mobility management network element sends, to the session management network element, an N11 message including the received terminal context setup response message, in order to forward the first information to the session management network element.

Optionally, the first information includes an identifier of the first session and a cause value, the first session is associated with the tunnel, and the cause value indicates that the tunnel information is invalid. Further optionally, the cause value may indicate why the tunnel information is invalid. For example, an invalidity cause may be that the access-network network element is unable to connect to the first user plane network element corresponding to the tunnel information. A specific invalidity cause is determined depending on an actual status, and details are not described herein.

It should be noted that, if the access-network network element determines that the tunnel information is valid, the access-network network element may directly complete an operation such as establishing a data radio bearer (DRB) channel between the terminal and the access-network network element.

In step 303, the first information that is sent by the access-network network element and that is received by the session management network element is forwarded by the mobility management network element. For details, refer to the foregoing descriptions. Details are not described herein again.

In step 304, after determining, based on the first information, that the tunnel information of the first session of the terminal is invalid, the session management network element selects the second user plane network element that serves the terminal.

The session management network element may determine the second user plane network element based on location information of the terminal. The location information of the terminal may be obtained using a service request (SR) message sent by the terminal in a process of paging the terminal, or may be obtained in another manner. This is not limited herein.

After determining the second user plane network element, the session management network element establishes a session with the second user plane network element, and establishes a new tunnel. Optionally, the session management network element further establishes a forwarding tunnel for buffered data.

For example, if neither the first user plane network element nor the second user plane network element is an anchor user plane network element, the session management network element may interact with the second user plane network element to establish the new tunnel, and establish a forwarding tunnel between the first user plane network element and the second user plane network element for buffered data. The session management network element interacts with an anchor user plane network element to modify the session, and establish a data channel between the anchor user plane network element and the second user plane network element. The session management network element interacts with the first user plane network element to establish the forwarding tunnel between the first user plane network element and the second user plane network element for the buffered data. After the foregoing steps, the forwarding tunnel between the first user plane network element and the second user plane network element is established, such that the downlink data for the terminal buffered on the first user plane network element can be forwarded to the second user plane network element, and the buffered downlink data is further sent to the terminal using an access-network network element connected to the second user plane network element. The new tunnel is a tunnel between the second user plane network element and the access-network network element, and a modified session is a session between the terminal and the second user plane network element through the access-network network element. After the forwarding tunnel is established, the first user plane network element forwards the received downlink data to the second user plane network element using the forwarding tunnel. After the first user plane network element completes forwarding on the buffered data, the session management network element interacts with the second user plane network element to delete the forwarding tunnel. In addition, the session management network element interacts with the first user plane network element to delete the forwarding tunnel and the first session.

Correspondingly, if the first user plane network element is an anchor user plane network element, and the second user plane network element is not an anchor user plane network element, the session management network element interacts with the second user plane network element to establish a new tunnel; and the session management network element interacts with the first user plane network element to modify the session, and establish a data channel between the first user plane network element and the second user plane network element, to transfer buffered data and the downlink data to the terminal using the data channel.

After establishing the new tunnel, the session management network element reconstructs N2 SM information that carries tunnel information of the new tunnel, and then sends the N2 SM information to the mobility management network element. Then, the mobility management network element transparently transmits the tunnel information of the new tunnel to the access-network network element, and the access-network network element completes DRB channel establishment.

After the foregoing process ends, the terminal may transmit uplink data to the second user plane network element.

After receiving the tunnel information of the new tunnel and determining that a user plane connection is activated, the access-network network element informs the session management network element of access-network network element tunnel information (e.g., RAN Tunnel Information) of the session via the mobility management network element.

It should be noted that the access-network network element tunnel information herein is tunnel information on an access network side. The tunnel information carried in the N2 SM information sent by the session management network element to the access network is core network N3 tunnel information. The forwarding tunnel is a tunnel between core network user plane network elements. There is a correspondence between the access-network network element tunnel information and the tunnel information that is carried in the N2 SM information sent by the session management network element to the access network. In other words, the access-network network element tunnel information and the core network N3 tunnel information indicate two ends of the connection of the tunnel between the core network and the access network.

The session management network element interacts with the second user plane network element to modify the session, and informs the second user plane network element of access-network network element tunnel information of a downlink data channel. The session management network element sends an acknowledgement message to the mobility management network element, such that a service setup process of the terminal is completed, and the terminal and the network side may transmit data to each other.

The following describes the foregoing process using various embodiments.

Figure 4A:
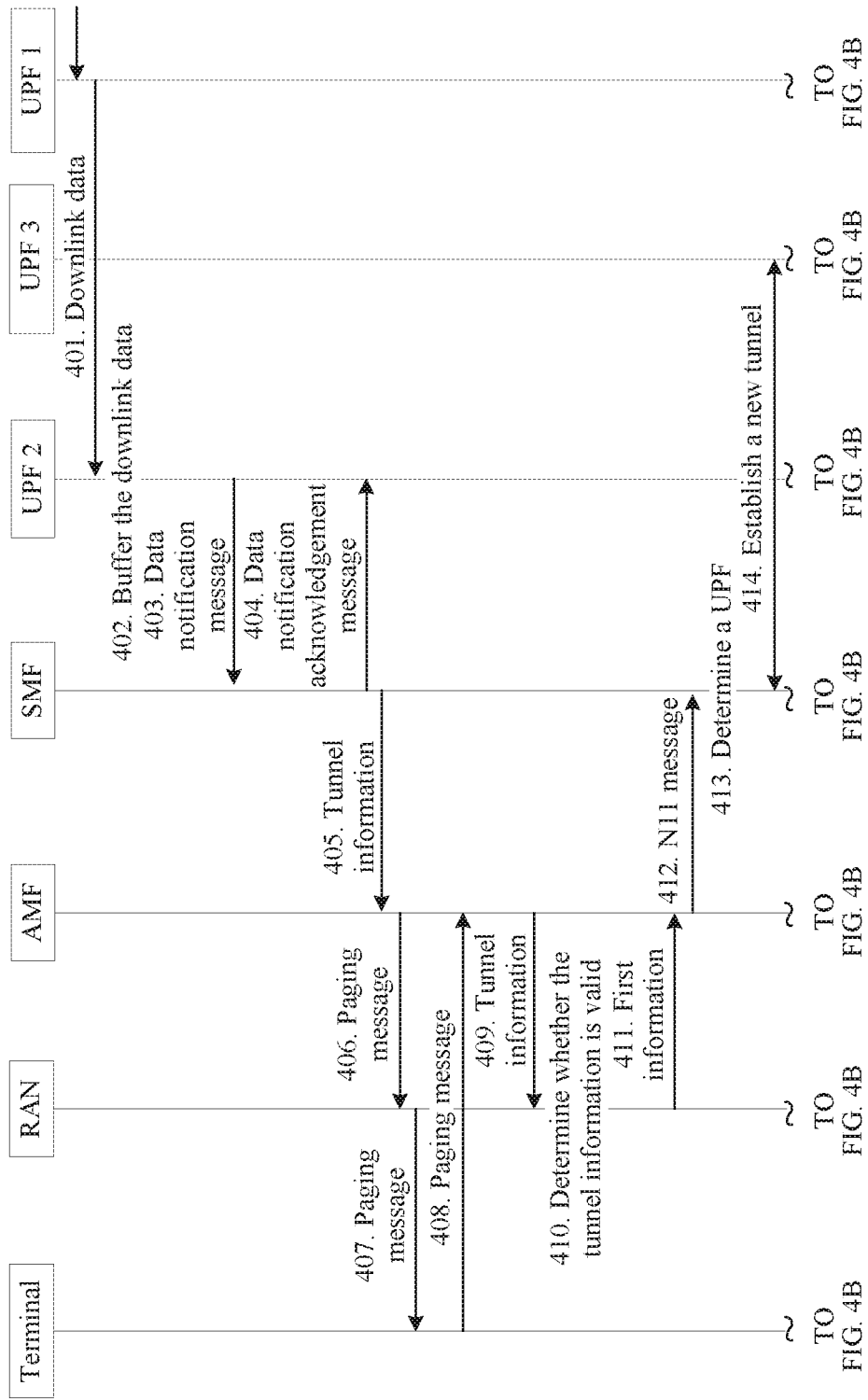
FIG. 4A and FIG. 4B are schematic flowcharts of a communication method according to an embodiment of this application.
Figure 4B:
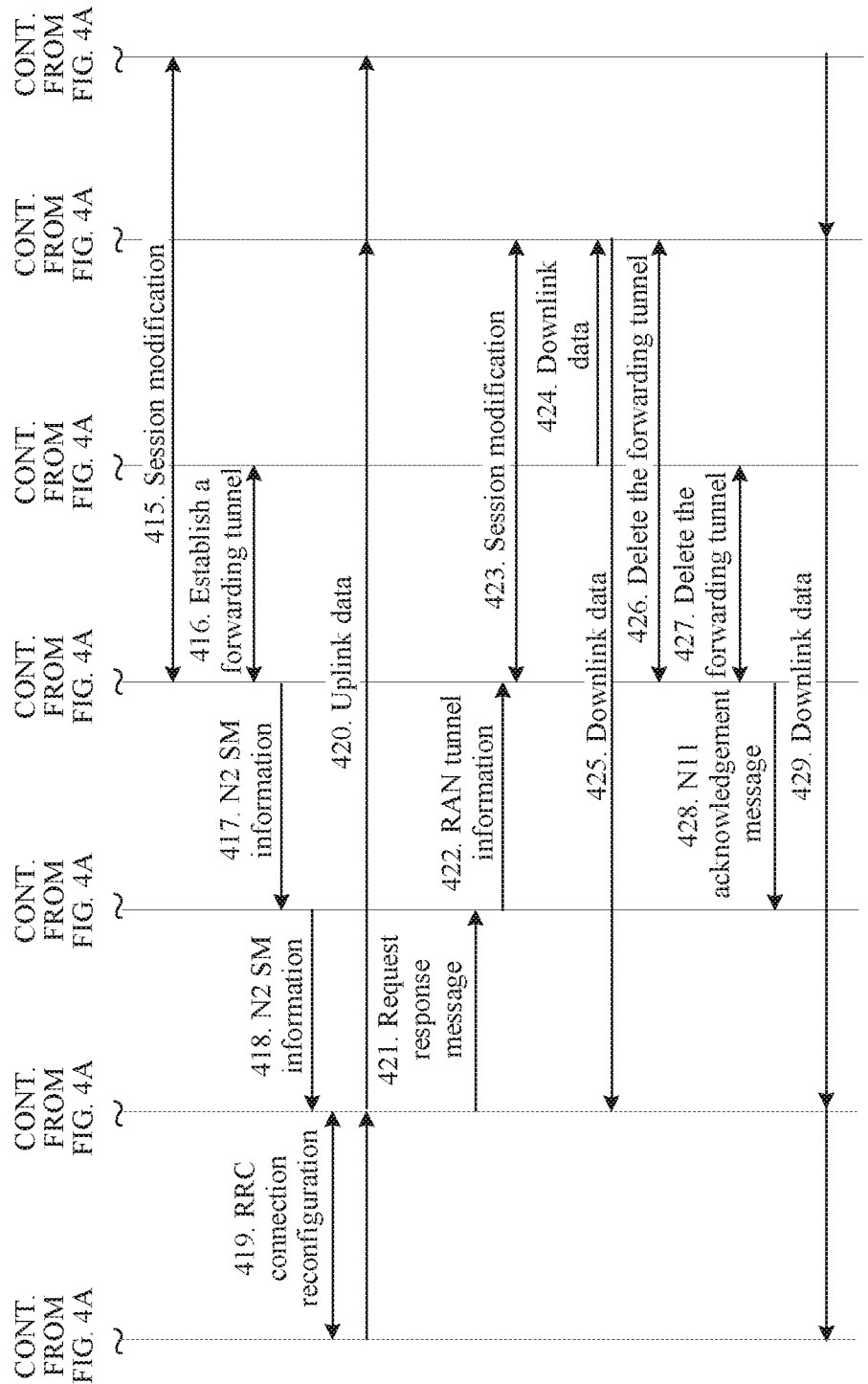

FIG. 4A and FIG. 4B are schematic flowcharts of a communication method according to an embodiment of this application.

A process in FIG. 4A and FIG. 4B is described using an example in which an access-network network element is a RAN, a mobility management network element is an AMF, a session management network element is an SMF, and a user plane network element is a UPF. For another case, refer to the process in FIG. 4. Details are not described herein.

In FIG. 4A and FIG. 4B, an anchor user plane network element is a UPF 1, a first user plane network element is a UPF 2, and a second user plane network element is a UPF 3. Both the first user plane network element and the second user plane network element are non-anchor user plane network elements. For example, downlink data sent by a network side to a terminal needs to be forwarded to the UPF 2 or the UPF 3 through the UPF 1, and correspondingly, uplink data received by the UPF 2 or the UPF 3 needs to be forwarded to a DN through the UPF 1.

Step 401: The UPF 1 forwards the received downlink data for the terminal to the UPF 2.

Step 402: The UPF 2 buffers the received downlink data.

Step 403: The UPF 2 sends a data notification message to the SMF, to inform the SMF that the UPF 2 has received the downlink data for the terminal.

Step 404: The SMF returns a data notification acknowledgement message to the UPF 2.

Step 405: The SMF determines tunnel information of a first session of the terminal, and sends an N11 message to the AMF to request the AMF to forward an N2 SM message, where the N11 message includes information such as a session identifier of the first session and session management information, and the session management information includes the tunnel information.

It should be noted that a UPF corresponding to the tunnel information determined by the SMF is the UPF 2.

For UE in a CM-idle state, a paging process needs to be initiated using step 406. For UE in a CM-connected state, the AMF does not need to initiate paging, and performs step 409.

Step 406: The AMF sends a paging message to the RAN.

Step 407: The RAN sends the paging message to the terminal.

Step 408: After receiving the paging message, the terminal sends a paging response message to the AMF via the RAN, to trigger a service setup process.

Step 409: The AMF sends, to the RAN, an N2 message that includes the tunnel information.

Step 410: The RAN determines whether the tunnel information is valid, and performs step 419 if the RAN determines that the tunnel information is valid, or performs step 411 if the RAN determines that the tunnel information is invalid.

For a method used by the RAN to determine whether the tunnel information is valid, refer to the foregoing descriptions. Details are not described herein again.

Step 411: The RAN sends an N2 response message to the AMF where the N2 response message includes first information, and the first information indicates that the tunnel information of the first session is invalid.

The first information may include the identifier of the first session and a cause value of tunnel information invalidity.

Step 412: The AMF sends, to the SMF, an N11 message that includes the N2 response message.

Step 413: After learning from the first information that the tunnel information is invalid, if the SMF has determined, based on latest location information, a UPF that serves the terminal, the SMF performs step 417; otherwise, the SMF determines a new UPF that serves the terminal, where the UPF determined in this case is the UPF 3.

Step 414: The SMF interacts with the UPF 3 to establish a new tunnel between the terminal and the UPF 3, and establish a forwarding tunnel between the UPF 2 and the UPF 3 for buffered data.

The new tunnel is a tunnel between the UPF 3 and the RAN.

Step 415: The SMF interacts with the UPF 1, to modify the session, and modify a connection between the UPF 1 and the UPF 2 into a connection between the UPF 1 and the UPF 3 for the first session.

Step 416: The SMF interacts with the UPF 2 to establish the forwarding tunnel between the UPF 2 and the UPF 3 for the buffered data.

Step 417: The SMF reconstructs N2 SM information, where the reconstructed N2 SM information carries tunnel information of the new tunnel; and then the SMF sends the information to the AMF.

Step 418: The AMF forwards the N2 SM information to the RAN, where the N2 SM information includes the tunnel information of the new tunnel.

Step 419: The RAN performs radio resource control (RRC) connection reconfiguration with the terminal, and establishes a DRB (the DRB is used for a wireless connection for data transmission).

Step 420: The terminal may start uplink data transmission.

Step 421: The RAN sends a request response message to the AMF, where the request response message includes RAN tunnel information.

Step 422: The AMF forwards the RAN tunnel information to the SMF.

Step 423: The SMF interacts with the UPF 3, to modify the session, and inform the UPF 3 of the RAN tunnel information of a downlink data channel.

Step 424: The UPF 2 forwards the buffered downlink data for the terminal to the UPF 3 using the forwarding tunnel.

Step 425: The UPF 3 forwards the downlink data to the terminal.

Step 426: The SMF interacts with the UPF 3, to delete the forwarding tunnel.

Step 427: The SMF interacts with the UPF 2, to delete the forwarding tunnel.

Step 428: The SMF sends an N11 acknowledgement message to the AMF, to complete the service setup process.

Step 429: The UPF 3 forwards the received downlink data to the terminal.

Certainly, in the foregoing process, the UPF 2 may alternatively be an anchor UPF. In this case, the SMF does not need to complete, for the session, processing on the forwarding tunnel between the UPF 2 and the UPF 3, the processing including establishing the forwarding tunnel, forwarding the buffered data, and deleting the forwarding tunnel in the foregoing process. Other processes are similar, and details are not described herein again.

In the foregoing process, the DRB may be established earlier on a RAN side. For example, after determining that a tunnel is invalid, the RAN first establishes the DRB, and returns, to the SMF via the AMF, an N2 SM response message that carries the RAN tunnel info. After obtaining a new CN N3 tunnel, the SMF only needs to notify the RAN to update a CN N3 tunnel interface. In this way, a modification operation for a newly established N3 UPF, namely, the UPF 3, is saved. In other words, the RAN tunnel info is sent to the UPF 3 when the UPF 3 is established. When both the UPF 2 and the UPF 3 are non-anchor user plane network elements, in other words, when forwarding-tunnel processing is involved, similar processing is performed, and details are not described herein again.

In the embodiments of this application, the mobility management network element may determine whether to update the session management information sent by the session management network element. Detailed descriptions are as follows.

Figure 5:
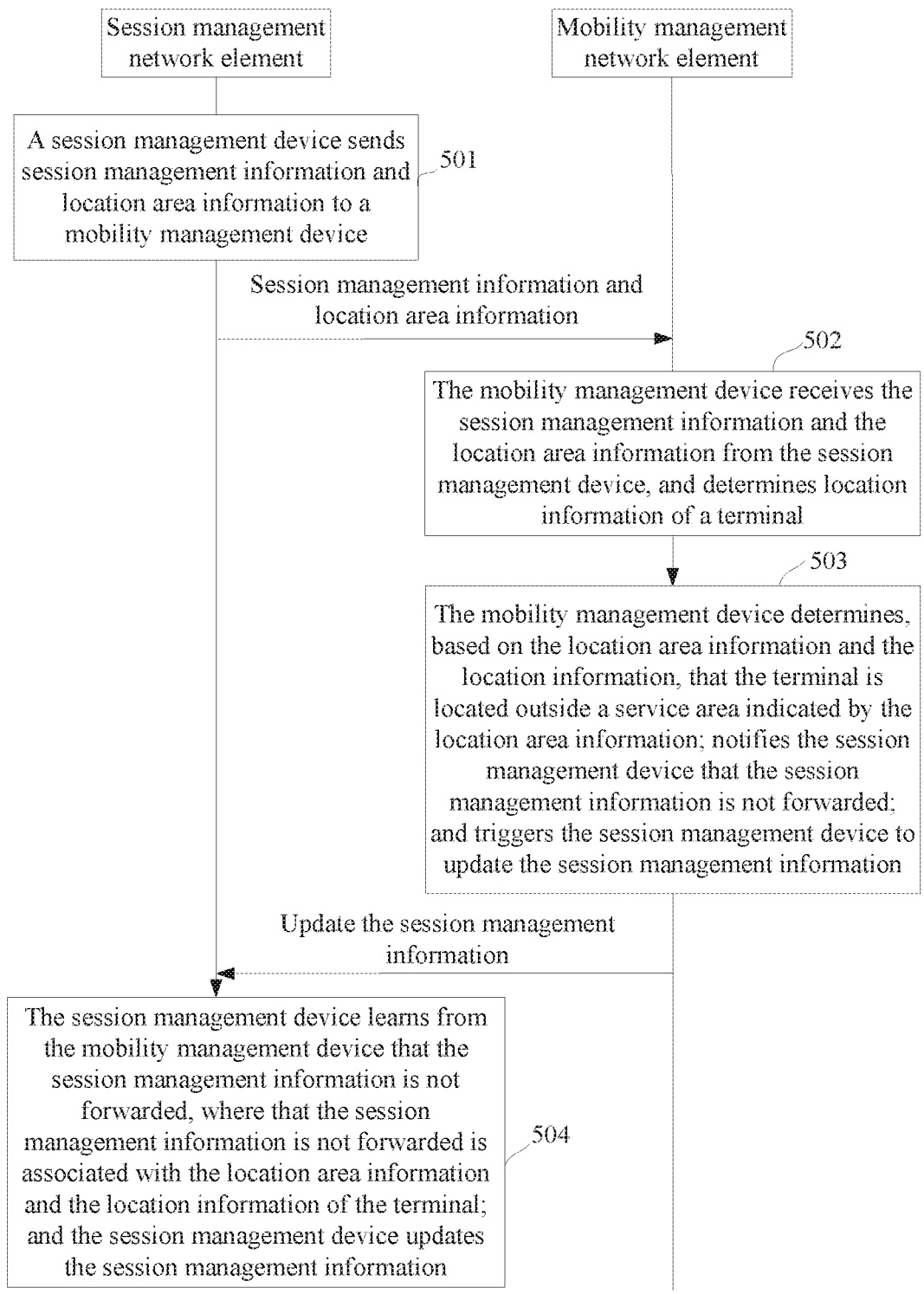
FIG. 5 is a schematic flowchart of a communication method according to an embodiment of this application.

With reference to the foregoing descriptions, referring to FIG. 5, FIG. 5 is a schematic flowchart of a communication method according to an embodiment of this application. The method includes the following steps.

Step 501: A session management network element sends session management information and location area information to a mobility management network element.

A location area indicated by the location area information may be a service area of a user plane network element that receives downlink data for a terminal.

The session management information includes but is not limited to N2 SM information, and the session management information includes tunnel information.

Step 502: The mobility management network element receives the session management information and the location area information from the session management network element, and determines location information of a terminal.

Step 503: The mobility management network element: determines, based on the location area information and the location information, that the terminal is located outside a service area indicated by the location area information; notifies the session management network element that the session management information is not forwarded; and triggers the session management network element to update the session management information.

Step 504: The session management network element: learns, from the mobility management network element, that the session management information is not forwarded, where that the session management information is not forwarded is associated with the location area information and the location information of the terminal; and updates the session management information.

According to the foregoing method, when determining, based on the location area information and the location information, that the terminal is located outside the service area indicated by the location area information, the mobility management network element may notify the session management network element that the session management information is not forwarded, and trigger the session management network element to update the session management information. This can ensure that a service of the terminal can be set up in a timely and effective manner, and avoid a service setup failure caused when the terminal is located in a service area of another user plane network element.

Before step 501, the terminal s possibly in an idle state, or the terminal is in a non-idle state but a first session of the terminal deactivated. The first session is a session between an access-network network element and a first user plane network element.

Before the terminal is in an idle state, or before the terminal is in a non-idle state but the first session of the terminal is deactivated, a network side instructs the first user plane network element to serve the terminal. The first user plane network element may be an anchor user plane network element, or may be a non-anchor user plane network element. This is not limited in this embodiment of this application. The non-idle state may be a connection management-idle state.

When the first user plane network element receives the downlink data for the terminal, if the terminal has moved out of a service area of the first user plane network element, the first user plane network element still informs the session management network element that the first user plane network element has received the downlink data for the terminal. Then, the session management network element may determine that a user plane network element corresponding to stored tunnel information of the first session is the first user plane network element, in order to send, to the mobility management network element connected to the session management network element, the session management information that includes the tunnel information.

In step 501, the session management network element sends a request message to the mobility management network element, where the request message is used to request the mobility management network element to forward an N2 SM message. The request message includes a session identifier of the first session, location area information, session management information, and the like. The session management information includes the tunnel information. The first user plane network element is a user plane network element that provides an N3 connection for the first session. Service area information of the service area of the first user plane network element may be a TAI list of a RAN to which the first user plane network element is able to connect. Alternatively, the location area information may be indicated by agreed identifier information, to reduce signaling overheads on an interface.

Finally, the mobility management network element completes paging the terminal using the access-network network element. For details, refer to the foregoing process. Details are not described herein again.

In step 502, the mobility management network element may obtain the location information of the terminal using an SR message sent by the terminal in a paging process.

Certainly, the mobility management network element may alternatively determine the location information of the terminal in another manner. Examples are not described herein one by one.

In step 503, if the mobility management network element determines, based on the location information of the terminal, that the terminal is located outside the location area indicated by the location area information, the mobility management network element may determine that the tunnel information is invalid. Otherwise, the mobility management network element may determine that the tunnel information is valid.

After determining that the tunnel information is invalid, the mobility management network element may send a first message to the session management network element, to indicate, using the first message, that the session management information is not forwarded or the session management information needs to be updated, thereby triggering the session management network element to update the session management information. A specific triggering manner is not limited in this embodiment of this application.

Alternatively, after determining that the tunnel information is invalid, the mobility management network element may not forward the session management information to the RAN, or may forward the session management information to the RAN but finally determine that forwarding fails. In this way, the mobility management network element may send, to the session management network element, information indicating that the session management information is not forwarded or the session management information needs to be updated. The information may be an execution result or a cause value. The information may be included in a first message.

Optionally, the first message may further include current location information of the terminal. The current location information of the terminal may be carried in the first message, or may be carried using independent subscription report information. An implementation of the first message carrying the current location information of the terminal may include: the location information may be directly carried in the first message sent by the mobility management network element, alternatively, when determining that the session management network element has subscribed to the location information of the terminal, the mobility management network element sends location report information while sending the first message. In this embodiment of this application, after determining that the tunnel information is valid, the mobility management network element performs a subsequent process according to other approaches. For example, the mobility management network element sends the tunnel information to the access-network network element.

In step 504, after receiving the first message, the session management network element may reconstruct session management information in response to the session management network element determines, based on the first message, that the session management information is not forwarded or the session management information needs to be updated, in order to obtain updated session management information. The updated session management information includes information about a second user plane network element for transmitting data to the terminal.

Optionally, selection of the second user plane network element is determined based on information such as the current location information of the terminal and a DN that a session accesses. Selection of the second user plane network element may be completed after the session management network element receives the first message, or may be completed after the session management network element receives an independent location information report.

The session management network element may determine, as the second user plane network element, a user plane network element whose service area covers the location information of the terminal. Certainly, the second user plane network element may alternatively be determined in another manner. Details are not described herein.

The session management network element may further interact with the first user plane network element to modify the session and establish a data channel between the first user plane network element and the second user plane network element, or establish a forwarding tunnel between the first user plane network element and the second user plane network element, for transmitting the buffered downlink data from the first user plane network element to the second user plane network element and then to the terminal.

The session management network element may send tunnel information of a new tunnel to the mobility management network element. Then, the mobility management network element transparently transmits the tunnel information of the new tunnel to the access-network network element, and the access-network network element completes DRB channel establishment.

After the foregoing process ends, the terminal may transmit uplink data to the second user plane network element.

After receiving the tunnel information of the new tunnel and determining that a user plane connection is activated, the access-network network element informs the session management network element of access-network network element tunnel information of the session using the mobility management network element.

The session management network element interacts with the second user plane network element, to modify the session, and inform the second user plane network element of access-network network element tunnel information of a downlink data channel.

Then, the first user plane network element forwards the received downlink data to the second user plane network element using the forwarding tunnel.

After the first user plane network element completes data forwarding processing, the session management network element interacts with the second user plane network element to delete the forwarding tunnel. In addition, the session management network element interacts with the first user plane network element to delete the forwarding tunnel and the first session.

The session management network element sends an acknowledgement message to the mobility management network element, such that a service setup process of the terminal is completed, and the terminal and the network side may transmit data to each other.

The following describes the foregoing process using various embodiments.

Figure 6:
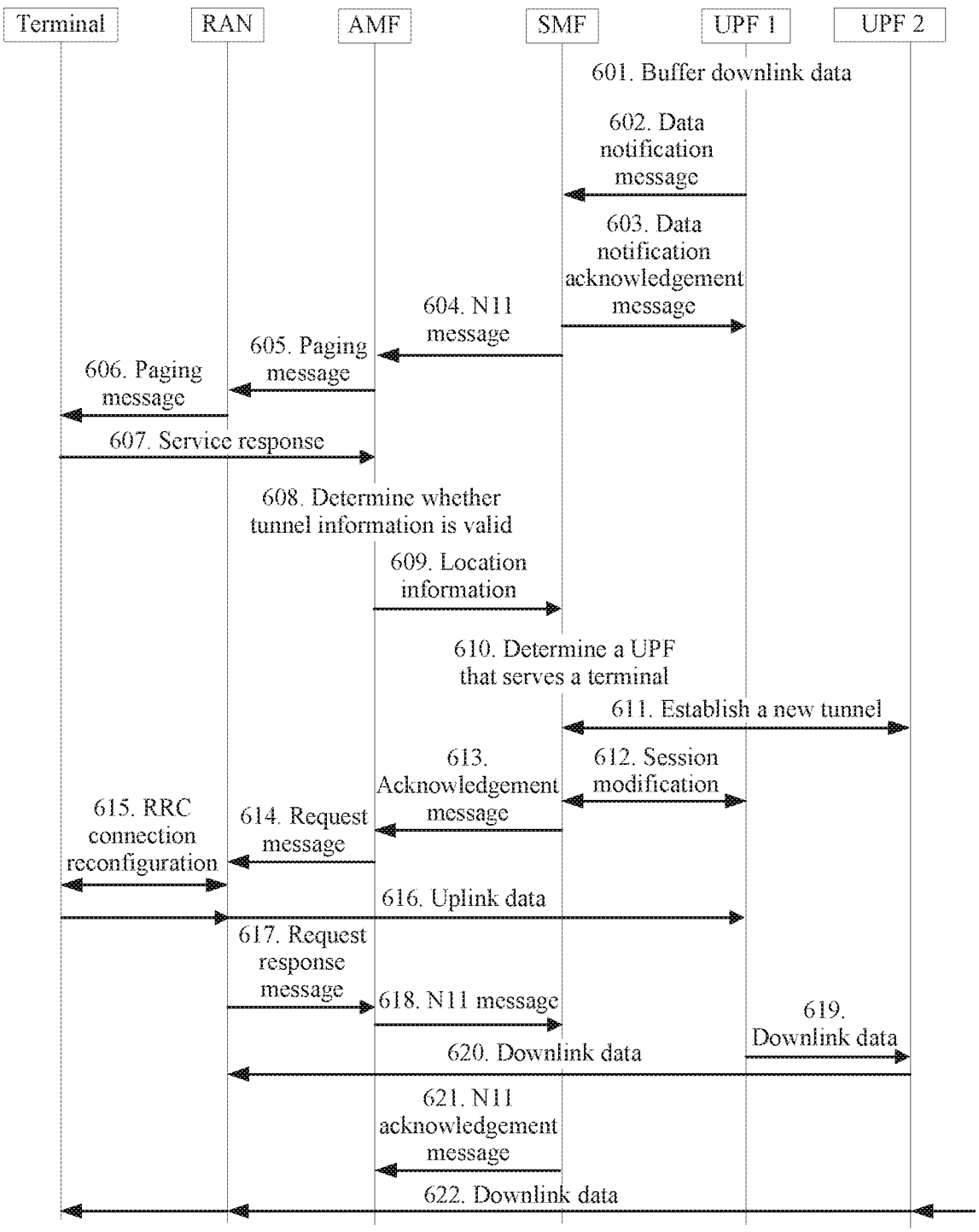
FIG. 6 is a schematic flowchart of a communication method according to an embodiment of this application.

As shown in FIG. 6, FIG. 6 is a schematic flowchart of a communication method according to an embodiment of this application.

A process in FIG. 6 is described using an example in which an access-network network element is a RAN, a mobility management network element is an AMF, a session management network element is an SMF, and a user plane network element is a UPF. For another case, refer to the process in FIG. 6. Details are not described herein again.

In FIG. 6, a first user plane network element is a UPF 1, and is an anchor user plane network element of a first session; a second user plane network element is a UPF 2, and is a non-anchor user plane network element of the first session.

Step 601: The UPF 1 buffers received downlink data for a terminal.

Step 602: The UPF 1 sends a data notification message to the SMF, to inform the SMF that the UPF 1 has received the downlink data for the terminal.

Step 603: The SMF returns a data notification acknowledgement message to the UPF 1.

Step 604: The SMF determines tunnel information of the first session of the terminal, and sends an N11 message to the AMF to request the AMF to forward an N2 SM message, where the N11 message includes information such as a session identifier of the first session, service area information, and session management information, and the session management information includes the tunnel information.

It should be noted that a UPF corresponding to the tunnel information determined by the SMF is the UPF 1.

Step 605: The AMF sends a paging message to the RAN. For UE in a CM-connected state, the AMF does not need to initiate paging, and performs step 608.

Step 606: The RAN sends the paging message to the terminal.

Step 607: After receiving the paging message, the terminal sends a service response message to the AMF via the RAN, to trigger a service setup process.

Step 608: The AMF determines whether the tunnel information is valid, and performs step 614 if the AMF determines that the tunnel information is valid, or performs step 609 if the AMF determines that the tunnel information is invalid.

Step 609: The AMF sends a first message to the SMF. The first message may carry location information. For example, the SMF may subscribe to the location information of the UE from the AMF and the AMF adds the location information to the first message that is sent to the SMF. Alternatively, the first message is a response message returned by the AMF to the SMF, and the location information is sent using an independent subscription report. Optionally, the first message further includes an N2 SM information forwarding result, where the result is that the session management information is not forwarded or the session management information needs to be updated.

Step 610: After learning about the N2 SM information forwarding result based on the first message, if the SMF has determined, based on latest location information, a UPF that serves the terminal, the SMF performs step 613; otherwise, the SMF determines a new UPF that serves the terminal, where the UPF determined in this case is the UPF 2.

Step 611: The SMF interacts with the UPF 2 to establish a new tunnel of a new session between the terminal and the UPF 2.

The new tunnel is a tunnel through which the UPF 2 is connected to the RAN.

Step 612: The SMF interacts with the UPF 1 to modify the session, and establish a data channel between the UPF 1 and the UPF 2.

Step 613: The SMF reconstructs N2 SM information, where the N2 SM information includes tunnel information of the new tunnel; and then, the SMF sends the N2 SM information to the AMF.

Step 614: The AMF forwards the tunnel information of the new tunnel to the RAN.

Step 615: The RAN performs RRC connection reconfiguration with the terminal.

Step 616: The terminal may start uplink data transmission in this case.

Step 617: The RAN sends a request response message to the AMF, where the request response message includes RAN tunnel information.

Step 618: The AMF sends an N11 message to the SMF, where the N11 message includes the RAN tunnel information.

Step 619: The UPF 1 forwards the buffered downlink data for the terminal to the UPF 2 using the data channel between the UPF 1 and the UPF 2.

Step 620: The UPF 2 forwards the downlink data to the terminal.

Step 621: The SMF sends an N11 acknowledgement message to the AMF, to complete the service setup process.

Step 622: The UPF 2 forwards the received downlink data to the terminal.

In a service-based architecture, the mobility management network element may also determine whether to update the session management information sent by the session management network element. Detailed descriptions are as follows.

Figure 7:
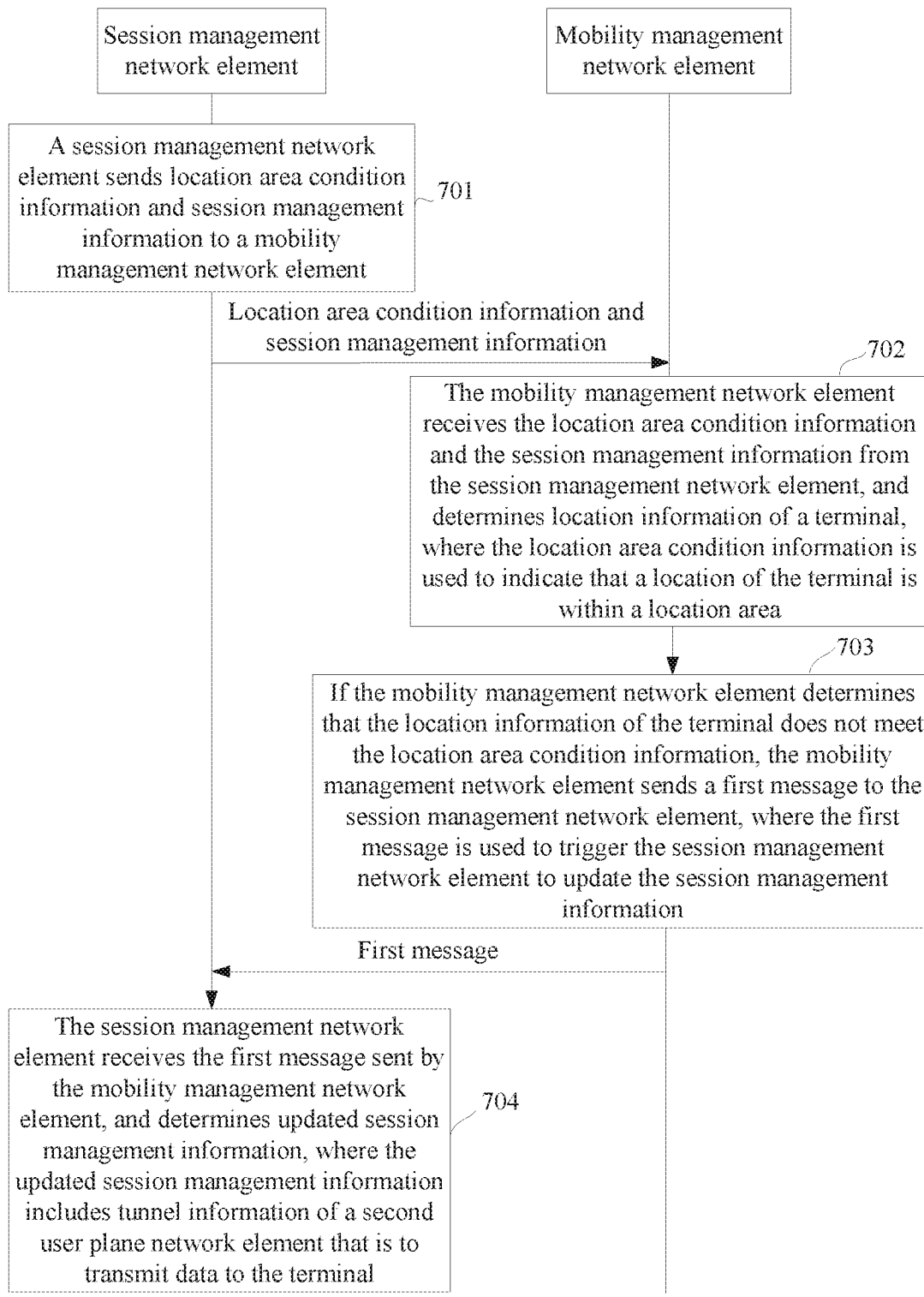
FIG. 7 is a schematic flowchart of a communication method according to an embodiment of this application.

With reference to the foregoing descriptions, FIG. 7 is a schematic flowchart of a communication method according to an embodiment of this application. The method includes the following steps.

Step 701: A session management network element sends location area condition information and session management information to a mobility management network element.

Optionally, the location area condition information indicates that a location of a terminal is within a location area, or the location area condition information includes a location area and a first condition, where the first condition indicates that a location of a terminal is within a location area.

The session management information includes core network tunnel information of a first session of the terminal.

Step 702: The mobility management network element receives the location area condition information and the session management information from the session management network element, and determines location information of a terminal, where the location area condition information indicates that a location of the terminal is within a location area.

In the foregoing steps, the location area indicates a service area of a first user plane network element that receives downlink data for the terminal. Location area information herein may alternatively be an agreed identifier, in order to reduce a size of a message sent by the session management network element. In a service-based architecture, for forwarding a first message that includes tunnel information, the session management network element invokes an N2 SM information forwarding service provided by the mobility management network element.

In this embodiment of this application, the condition information includes but is not limited to that the location information of the terminal is within a service area indicated by the service area information. Correspondingly, the first user plane network element herein is a user plane network element that provides an N3 connection for the first session. Service area information of the service area of the first user plane network element may be a TAI list of a RAN to which the first user plane network element is able to connect.

Step 703: If the mobility management network element determines that the location information of the terminal does not meet the location area condition information, the mobility management network element sends, to the session management network element, a first message for triggering the session management network element to update the session management information.

When determining that the service area information and the location information meet the condition information, the mobility management network element may directly forward the session management information to an access-network network element, and does not send a response message (the first message) to the session management network element. Therefore, the mobility management network element does not need to update N2 SM information.

As described above, in this embodiment of this application, the session management information is the N2 SM information that includes the core network tunnel information. The session management network element requests the mobility management network element to forward the information to an access network.

Optionally, if the mobility management network element determines that the service area information and the location information meet the condition information, the mobility management network element does not send the first message, and further does not need to update the N2 SM information, but directly forwards the session management information to the access network.

Step 704: The session management network element receives the first message sent by the mobility management network element, and determines updated session management information, where the updated session management information includes tunnel information of a second user plane network element for transmitting data to the terminal.

The first message is sent after the mobility management network element determines that the location information does not meet the location area condition information.

According to the foregoing method, when determining that the location information of the terminal does not meet the location area condition information, the mobility management network element sends, to the session management network element, the first message for triggering the session management network element to update the session management information. This can ensure that a service of the terminal can be set up in a timely and effective manner, and avoid a service setup failure caused when the terminal is located in a service area of another user plane network element.

For other content of step 701 to step 704, refer to descriptions in step 501 to step 504. Details are not described herein again.

Figure 8:
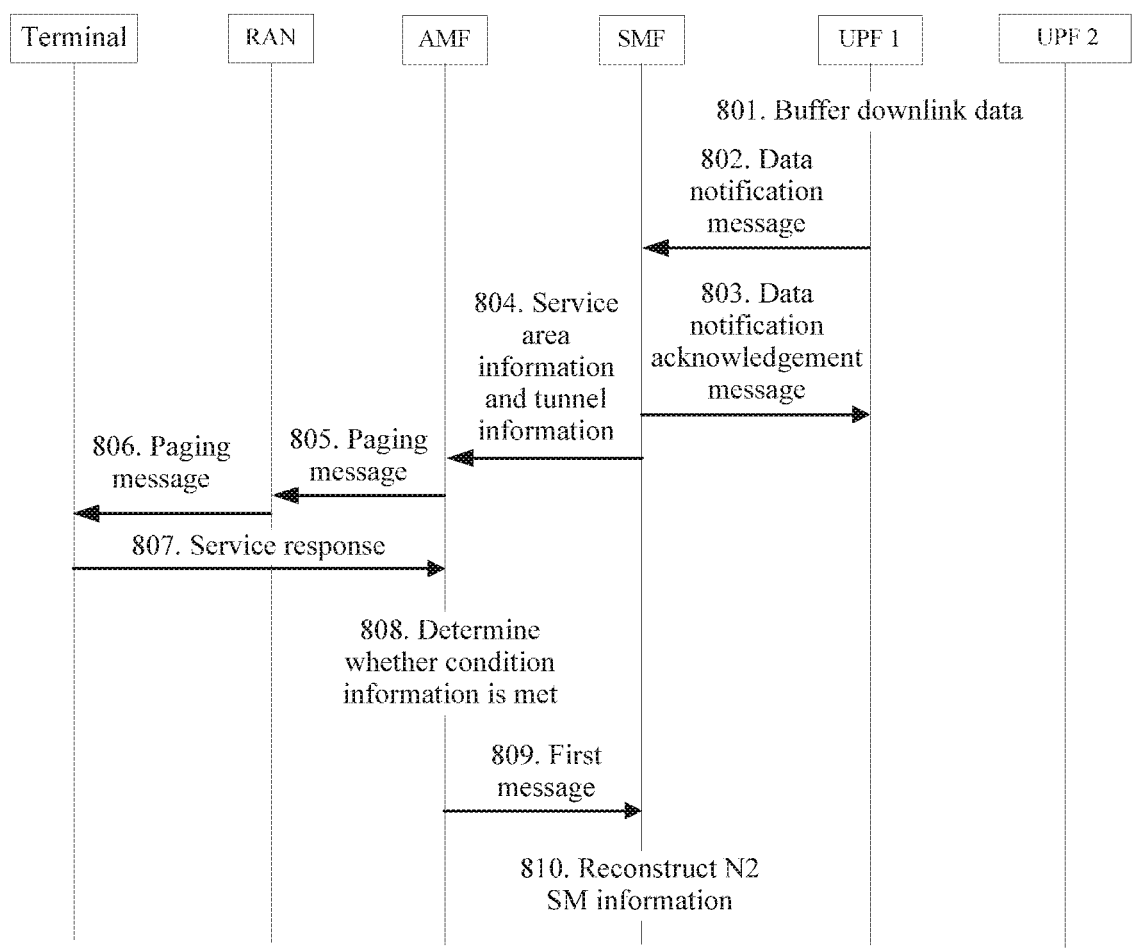
FIG. 8 is a schematic flowchart of a communication method according to an embodiment of this application.

With reference to the foregoing descriptions, FIG. 8 is a schematic flowchart of a communication method according to an embodiment of this application.

A process in FIG. 8 is described using an example in which an access-network network element is a RAN, a mobility management network element is an AMF, a session management network element is an SMF, and a user plane network element is a UPF. For another case, refer to the process in FIG. 8. Details are not described herein again.

In FIG. 8, a first user plane network element is a UPF 1, and is an anchor user plane network element of a first session; a second user plane network element is a UPF 2, and is a non-anchor user plane network element of the first session.

Step 801: The UPF 1 buffers received downlink data for a terminal.

Step 802: The UPF 1 sends a data notification message to the SMF, to inform the SMF that the UPF 1 has received the downlink data for the terminal.

Step 803: The SMF returns a data notification acknowledgement message to the UPF 1.

Step 804: The SMF determines core network tunnel information of the first session of the terminal, and sends an N11 message to the AMF to request the AMF to forward an N2 SM message, where the N11 message includes information such as location area condition information, session management information (N2 SM information), and a session identifier of the first session, and the session management information includes the tunnel information.

Step 805: The AMF sends a paging message to the RAN. For UE in a CM-connected state, the AMF does not need to initiate paging, and performs step 808.

Step 806: The RAN sends the paging message to the terminal.

Step 807: After receiving the paging message, the terminal sends a service response message to the AMF via the RAN, to trigger a service setup process.

Step 808: The AMF determines that location information of the terminal meets the location area condition information, and if the terminal is within a location area, the AMF may determine that the tunnel information is valid, and therefore may directly forward the tunnel information to the access-network network element; otherwise, the AMF performs step 809.

Step 809: The AMF sends, to the SMF, a first message that includes the location information, where the first message triggers the SMF to update the session management information. The first message may carry an N2 SM information forwarding result and the location information. For example, the SMF may subscribe to the location information of the UE from the AMF, and the AMF adds the location information to the first message that is sent to the SMF. Alternatively, the first message is a response message returned by the AMF to the SMF, and the first message carries an N2 SM information forwarding result, where the result is that the N2 SM information is not forwarded or needs to be updated. The location information is not carried in the first message, but is sent using an independent subscription report.

Step 810: After receiving the first message, the SMF reconstructs N2 SM information, where the reconstructed N2 SM information includes information about a UPF that serves the terminal at a current location. In this way, update of the session management information is implemented. The UPF that serves the terminal in this case is the UPF 2.

For a process after step 810, refer to descriptions in step 610 to step 621. Details are not described herein again.

In the embodiments of this application, the session management network element may further determine whether the tunnel information is valid. Detailed descriptions are as follows.

Figure 9:
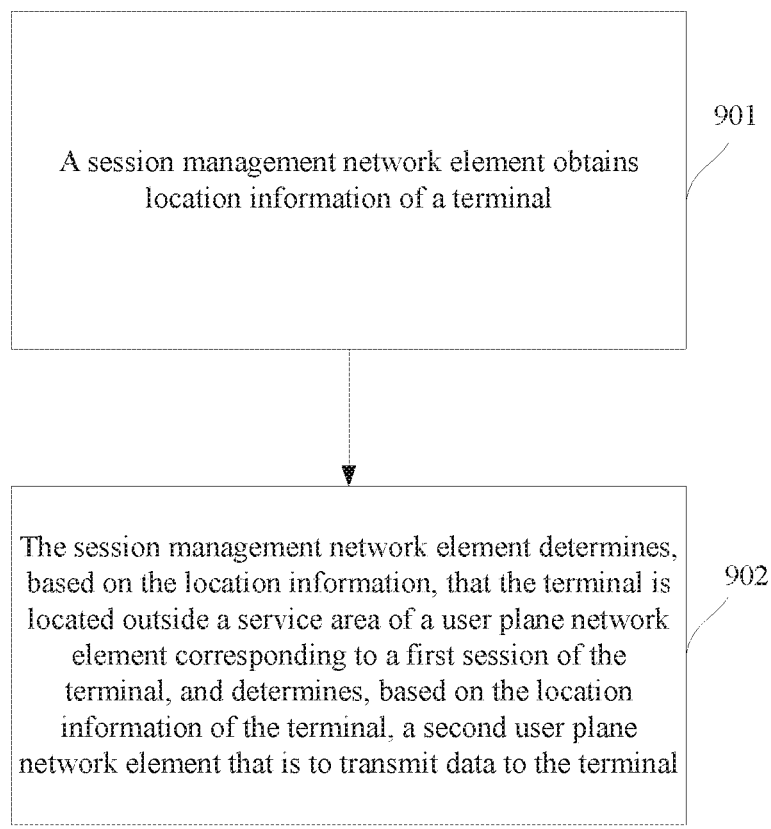
FIG. 9 is a schematic flowchart of a communication method according to an embodiment of this application.

With reference to the foregoing descriptions, FIG. 9 is a schematic flowchart of a communication method according to an embodiment of this application. The method includes the following steps.

Step 901: A session management network element obtains location information of a terminal.

Step 902: The session management network element determines, based on the location information, that the terminal is located outside a service area of a user plane network element corresponding to a first session of the terminal, and determines, based on the location information of the terminal, a second user plane network element for transmitting data to the terminal.

According to the foregoing method, after obtaining the location information of the terminal, the session management network element determines, based on the location information, that the terminal is located outside the service area of the user plane network element corresponding to the first session of the terminal. In this case, the session management network element may determine that received tunnel information is invalid, in order to determine, based on the location information of the terminal, the second user plane network element for transmitting data to the terminal. This ensures that a service of the terminal can be set up in a timely and effective manner, and avoid a service setup failure caused when the terminal is located in a service area of another user plane network element.

Before step 901, the terminal is possibly in an idle state, or the terminal is in a non-idle state but the first session of the terminal is deactivated.

Before the terminal is in an idle state, or before the terminal is in a non-idle state but the first session of the terminal is deactivated, when a first user plane network element that serves the terminal receives downlink data for the terminal, if the terminal has moved out of a service area of the first user plane network element, the first user plane network element still informs the session management network element that the first user plane network element has received the downlink data for the terminal. The first user plane network element may be an anchor user plane network element, or may be a non-anchor user plane network element. This is not limited in this embodiment of this application.

After determining that the first user plane network element has received the downlink data for the terminal, the session management network element may obtain previously stored first tunnel information corresponding to the first session of the terminal.

In step 901, the session management network element may send, to a mobility management network element, a first message that requests the location information of the terminal, to obtain the location information of the terminal.

In this implementation, after receiving a downlink data notification message sent by the first user plane network element, the session management network element sends, to the mobility management network element, the first message that requests the location information of the terminal. After receiving the first message, the mobility management network element may determine the location information of the terminal based on a status of the terminal. For example, when determining that the terminal is in a connected state, the mobility management network element may directly obtain the location information of the terminal; or when determining that the terminal is in an idle state, the mobility management network element may obtain the location information of the terminal by paging the terminal. Then, the mobility management network element may send the location information to the session management network element.

It should be noted that, in this scenario, the first message may alternatively be a newly added interaction message, and the message carries an identifier of the terminal. In a service-based architecture, in this case, the session management network element needs to invoke a new service used for obtaining a location of the terminal. Optionally, the first message may be a session management information forwarding message that carries no tunnel information. In the service-based architecture, in this case, the session management network element may alternatively invoke an N2 SM information forwarding service provided by an AMF.

In step 902, if the session management network element determines, based on the location information, that the terminal is located outside a service area of a user plane network element that receives the downlink data for the terminal, the session management network element may determine that the terminal is located outside the service area of the first user plane network element corresponding to the first session of the terminal, and determine that the tunnel information is invalid; otherwise, the session management network element may determine that the tunnel information is valid.

It should be noted that, when determining that the tunnel information is valid, the session management network element performs a subsequent process according to other approaches. For example, the session management network element forwards, to an access network via the mobility management network element, the session management information that includes core network tunnel information.

After determining the second user plane network element, the session management network element may further interact with the first user plane network element to modify the session, and establish a data channel between the first user plane network element and the second user plane network element, or establish a forwarding tunnel between the first user plane network element and the second user plane network element, to transmit the buffered downlink data from the first user plane network element to the second user plane network element and then to the terminal. For details, refer to step 504 and descriptions related to step 504. Details are not described herein again.

Optionally, in this embodiment of this application, the session management network element may alternatively obtain at least one of a mobility attribute and the location information of the terminal; then, the session management network element determines, based on the at least one of the mobility attribute and the location information, that the terminal is located outside the service area of the user plane network element corresponding to the first session of the terminal, and determines, based on the location information of the terminal, a second user plane network element for transmitting data to the terminal.

Detailed descriptions are as follows.

In the foregoing process, the mobility attribute of the terminal obtained by the session management network element may be included in a mobility pattern, or may be an independent mobility attribute parameter. The session management network element may obtain the mobility attribute of the terminal from the AMF or an NWDA using an establishment/modification/release process of the first session, or may subscribe to the mobility attribute from an NWDA. For a process of obtaining the mobility attribute, details are not described herein.

In this embodiment of this application, in a possible implementation, the session management network element may obtain the location information of the terminal from the AMF using a session establishment/modification/release process, or may subscribe to the location information of the terminal from the AMF. For a process of obtaining the location information in this implementation, details are not described herein.

The session management network element determines, based on different obtained parameters, that the terminal is located outside the service area of the first user plane network element corresponding to the first session of the terminal. The following describes each case.

1. The session management network element obtains the mobility attribute of the terminal.

In this case, if the session management network element determines, based on the mobility attribute, that the terminal is a high-mobility terminal, the session management network element may determine that the terminal is located outside the service area of the first user plane network element corresponding to the first session of the terminal, and determine that the tunnel information is invalid, where the tunnel information is information about a tunnel between the first user plane network element corresponding to the first session and an access-network network element. Correspondingly, if the session management network element determines, based on the mobility attribute, that the terminal is a low-mobility terminal, the session management network element may determine that the tunnel information is valid.

The high-mobility terminal may be a terminal whose moving speed is greater than a threshold, and the low-mobility terminal may be a terminal whose moving speed is less than or equal to the threshold.

2. The session management network element obtains the location information of the terminal.

In this case, if the session management network element determines, based on the location information, that the terminal has moved out of the service area of the user plane network element that receives the downlink data for the terminal, the session management network element may determine that the tunnel information is invalid. Otherwise, the session management network element may determine that the terminal is located within the service area of the first user plane network element corresponding to the first session of the terminal, and determine that the tunnel information is valid.

3. The session management network element obtains the mobility attribute and the location information of the terminal.

In this case, if the session management network element determines, based on the mobility attribute, that the terminal is a low-mobility terminal, and determines, based on the location information, that the terminal is located outside the service area of the user plane network element that receives the downlink data for the terminal, the session management network element may determine that the terminal is located outside the service area of the first user plane network element corresponding to the first session of the terminal, and determine that the tunnel information is invalid; otherwise, the session management network element may determine that the tunnel information is valid.

In this scenario, after determining that the tunnel information is invalid, the session management network element may send, to the mobility management network element, the first message that carries no tunnel information, to request current location information of the terminal; and determine, based on the current location information of the terminal obtained through requesting, the second user plane network element for transmitting data to the terminal. For example, the session management network element may determine, as the second user plane network element, a user plane network element whose service area covers the current location information of the terminal. Certainly, the session management network element may alternatively determine the second user plane network element in another manner, and details are not described herein. The current location f lion requested by the session management network element is latest location information, such that the second user plane network element can be accurately determined for the terminal. For a process of determining the second user plane network element, refer to other approaches. Details are not described herein.

After receiving the first message, if the mobility management network element determines that the first message carries no tunnel information, the mobility management network element may obtain the current location information of the terminal, to send the current location information of the terminal to the session management network element. If the mobility management network element determines that the first message carries the tunnel information, the mobility management network element may directly forward the tunnel information to the access-network network element.

Optionally, in this scenario, the first message may alternatively be a newly added interaction message, and the message carries an identifier of the terminal. In a service-based architecture, in this case, a new terminal location obtaining service of the session management network element needs to be invoked.

For another action performed by the session management network element after the session management network element determines, based on the at least one of the mobility attribute and the location information, that the terminal is located outside the service area of the user plane network element corresponding to the first session of the terminal, refer to descriptions in step 902. Details are not described herein again.

Figure 10:
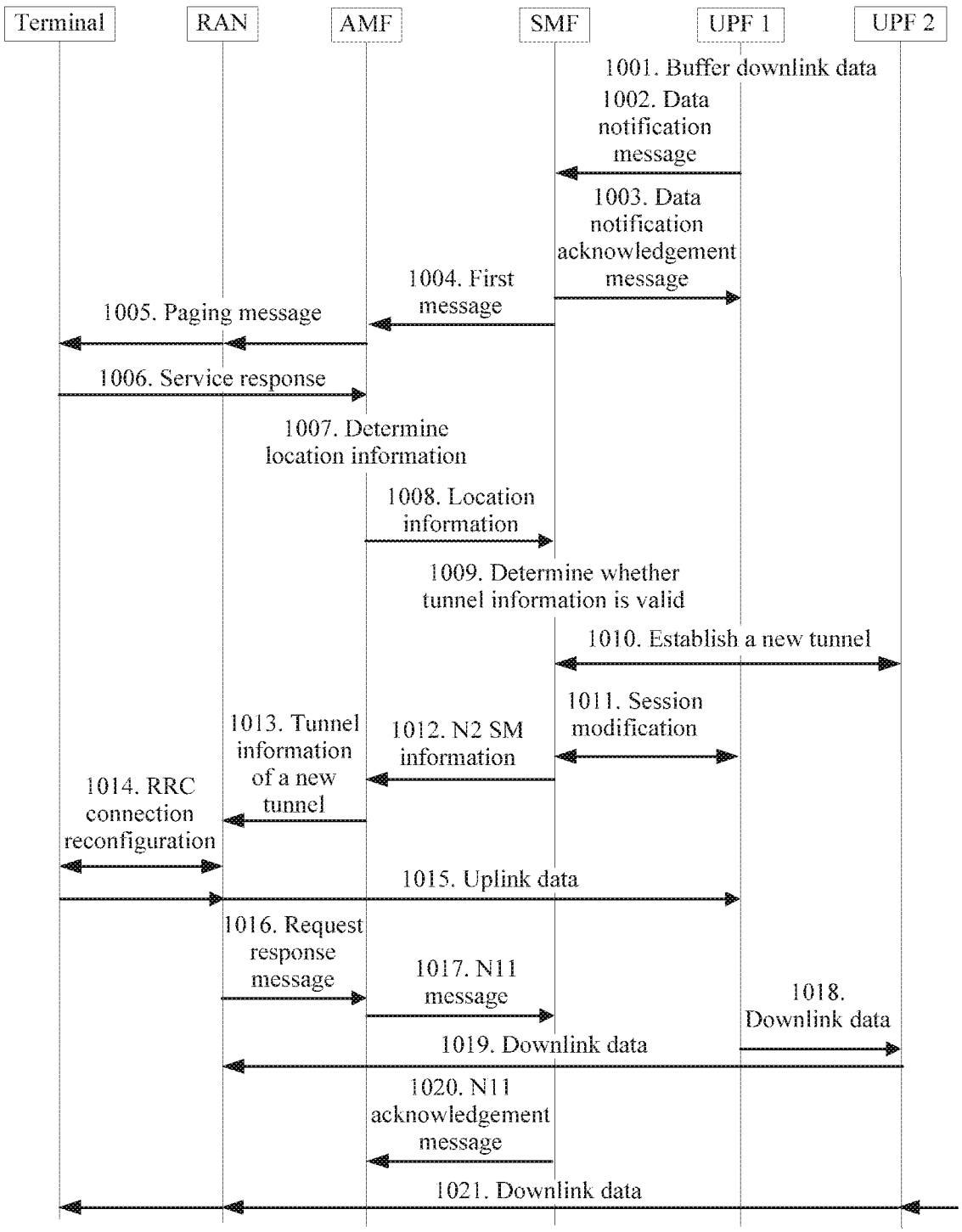
FIG. 10 is a schematic flowchart of a communication method according to an embodiment of this application.

With reference to the foregoing descriptions, FIG. 10 is a schematic flowchart of a communication method according to an embodiment of this application.

A process in FIG. 10 is described using an example in which an access-network network element is a RAN, a mobility management network element is an AMF, a session management network element is an SMF and a user plane network element is a UPF. For another case, refer to descriptions of the process shown in FIG. 10. Details are not described herein again.

In FIG. 10, a first user plane network element is a UPF 1, and is an anchor user plane network element of a first session; a second user plane network element is a UPF 2, and is a non-anchor user plane network element of the first session.

Step 1001: The UPF 1 buffers received downlink data for a terminal.

Step 1002: The UPF 1 sends a data notification message to the SMF, to inform the SMF that the UPF 1 has received the downlink data for the terminal.

Step 1003: The SMF returns a data notification acknowledgement message to the UPF 1.

Step 1004: The SMF sends a first message to the AMF, to request location information of the terminal.

Step 1005: The AMF sends a paging message to the terminal via the RAN.

Step 1006: After receiving the paging message, the terminal sends a service response message to the AMF via the RAN, to trigger a service setup process.

Step 1007: The AMF determines the location information of the terminal based on a status of the terminal.

Step 1008: The AMF sends the location information of the terminal to the SMF.

Step 1009: The SMF determines, based on the location information, whether a location of the terminal is within a service area of the UPF 1, to determine whether tunnel information of the first session is valid; and if the tunnel information is valid, the SMF performs step 1012; otherwise, the SMF determines, based on the location information, a new UPF that serves the terminal, and performs step 1010, where the UPF determined in this case is the UPF 2.

Step 1010: The SMF interacts with the UPF 2 to establish a new tunnel of a new session between the terminal and the UPF 2.

The new tunnel is a tunnel between the UPF 2 and the RAN.

Step 1011: The SMF interacts with the UPF 1 to modify the session, and establishes a data channel between the UPF 1 and the UPF 2.

Step 1012: The SMF constructs N2 SM information. If it is determined, based on the location information, that the location of the terminal is within the service area of the UPF 1, the N2 SM information is constructed by directly using original core network tunnel information. Otherwise, the N2 SM information is constructed using core network tunnel information of the new tunnel; and then, the SMF sends the N2 SM information to the AMF.

Step 1013: The AMF forwards the tunnel information of the new tunnel to the RAN.

Step 1014: The RAN performs RRC connection reconfiguration with the terminal, and establishes a DRB.

Step 1015: The terminal may start uplink data transmission in this case.

Step 1016: The RAN sends a request response message to the AMF, where the request response message includes RAN tunnel information.

Step 1017: The AMF sends an N11 message to the SMF, where e N11 message includes the RAN tunnel information.

Step 1018: The UPF 1 forwards the buffered downlink data for the terminal to the UPF 2 using the data channel between the UPF 1 and the UPF 2.

Step 1019: The UPF 2 forwards the downlink data to the terminal.

Step 1020: The SMF sends an N11 acknowledgement message to the AMF, to complete the service setup process.

Step 1021: The UPF 2 forwards the received downlink data to the terminal.

In the process shown in FIG. 10, when both the UPF 1 and the UPF 2 are non-anchor user plane network elements of the first session, and each of the UPF 1 and the UPF 2 transmits data to the terminal using an anchor user plane network element of the first session, the SMF needs to complete, for the session, processing of a forwarding tunnel established between the UPF 2 and a UPF 3. All other processes are similar, and details are not described herein again. For a process in which the SMF needs to establish a forwarding tunnel between the UPF 1 and the UPF 2, refer to the process shown in FIG. 4A and FIG. 4B. Details are not described herein again.

Figure 11:
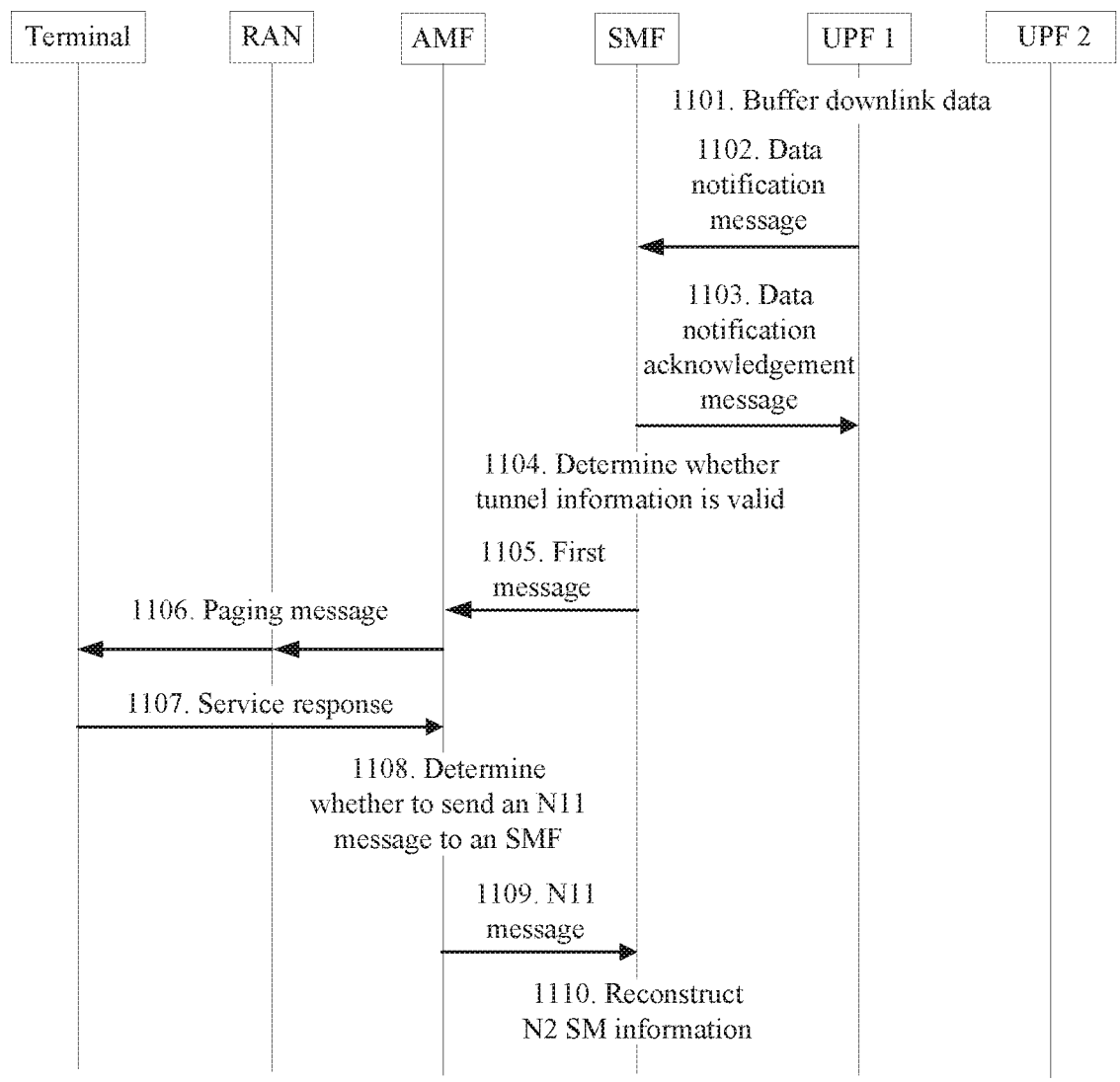
FIG. 11 is a schematic flowchart of a communication method according to an embodiment of this application.

With reference to the foregoing descriptions, FIG. 11 is a schematic flowchart of a communication method according to an embodiment of this application.

A process in FIG. 11 is described using an example in which an access-network network element is a RAN, a mobility management network element is an AMF, a session management network element is an SMF, and a user plane network element is a UPF. For another case, refer to descriptions of the process shown in FIG. 11. Details are not described herein again.

In FIG. 11, a first user plane network element is a UPF 1, and is an anchor user plane network element of a first session; a second user plane network element is a UPF 2, and is a non-anchor user plane network element of the first session.

Step 1101: The UPF 1 buffers received downlink data for a terminal.

Step 1102: The UPF 1 sends a data notification message to the SMF, to inform the SMF that the UPF 1 has received the downlink data for the terminal.

Step 1103: The SMF returns a data notification acknowledgement message to the UPF 1.

Step 1104: The SMF determines, based on at least one of a mobility attribute and location information of the terminal, whether the terminal is located within a service area of the UPF 1, to determine whether tunnel information of the first session is valid. If the tunnel information is valid, the SMF determines to send, to the AMF, a first message that includes session management information of the tunnel information; otherwise, the SMF determines to send, to the AMF, a first message that does not include session management information of the tunnel information.

Step 1105: The SMF sends the first message to the AMF.

Step 1106: The AMF sends a paging message to the terminal via the RAN.

Step 1107: After receiving the paging message, the terminal sends a service response message to the AMF via the RAN, to trigger a service setup process.

Step 1108: The AMF determines whether the AMF needs to send an N11 message to the SMF that triggers paging.

For example, if the received first message includes N2 SM information that carries the tunnel information, the AMF directly forwards the N2 SM information to the RAN; otherwise, the AMF performs step 1109.

Step 1109: The AMF sends the N11 message to the SMF, to trigger the SMF to reconstruct N2 SM information.

Step 1110: The SMF reconstructs the N2 SM information, where the reconstructed N2 SM information includes information about a UPF that serves the terminal at a current location, and the UPF that serves the terminal in this case is the UPF 2. The UPF determined in this case is the UPF 2.

For a process after step 1110, refer to descriptions in step 1010 to step 1021. Details are not described herein again.

The following describes how to release a session.

In a service-based architecture, the mobility management network element may also determine whether to forward the session management information sent by the session management network element. Detailed descriptions are as follows.

The method includes the following steps.

Step 1: The session management network element sends terminal status condition information and the session management information to the mobility management network element.

Optionally, the terminal status condition information indicates that a status of the terminal is an idle state, or indicates a status of the terminal and a first condition, where the first condition indicates that the status of the terminal is an idle state.

Optionally, the terminal status condition information may further include "N1 SM delivery can be skipped".

The session management information includes N1 SM information.

Step 2: The mobility management network element receives the terminal status condition information and the session management information from the session management network element, and determines a status of the terminal, where the terminal status condition information indicates that the status of the terminal is an idle state.

In the foregoing steps, in the service-based architecture, for forwarding of the N1 SM information, the session management network element invokes an N1 SM information forwarding service provided by the mobility management network element.

Correspondingly, the status of the terminal is a current state of the terminal.

Step 3: If the mobility management network element determines that the status of the terminal does not meet the terminal status condition information, the mobility management network element does not forward the N1 SM information to the terminal, and for N1 SM release information, releases the session of the terminal through implicit synchronization.

According to the foregoing method, the session management network element determines to release a session in an appropriate manner. For a session that requires status synchronization, explicit release is provided to avoid service abnormality. For a session that does not require status synchronization, a session of the terminal is released through implicit synchronization, thereby reducing system overheads.

The foregoing steps 1, 2, and 3 may also be described with reference to descriptions of FIG. 12.

Figure 12:
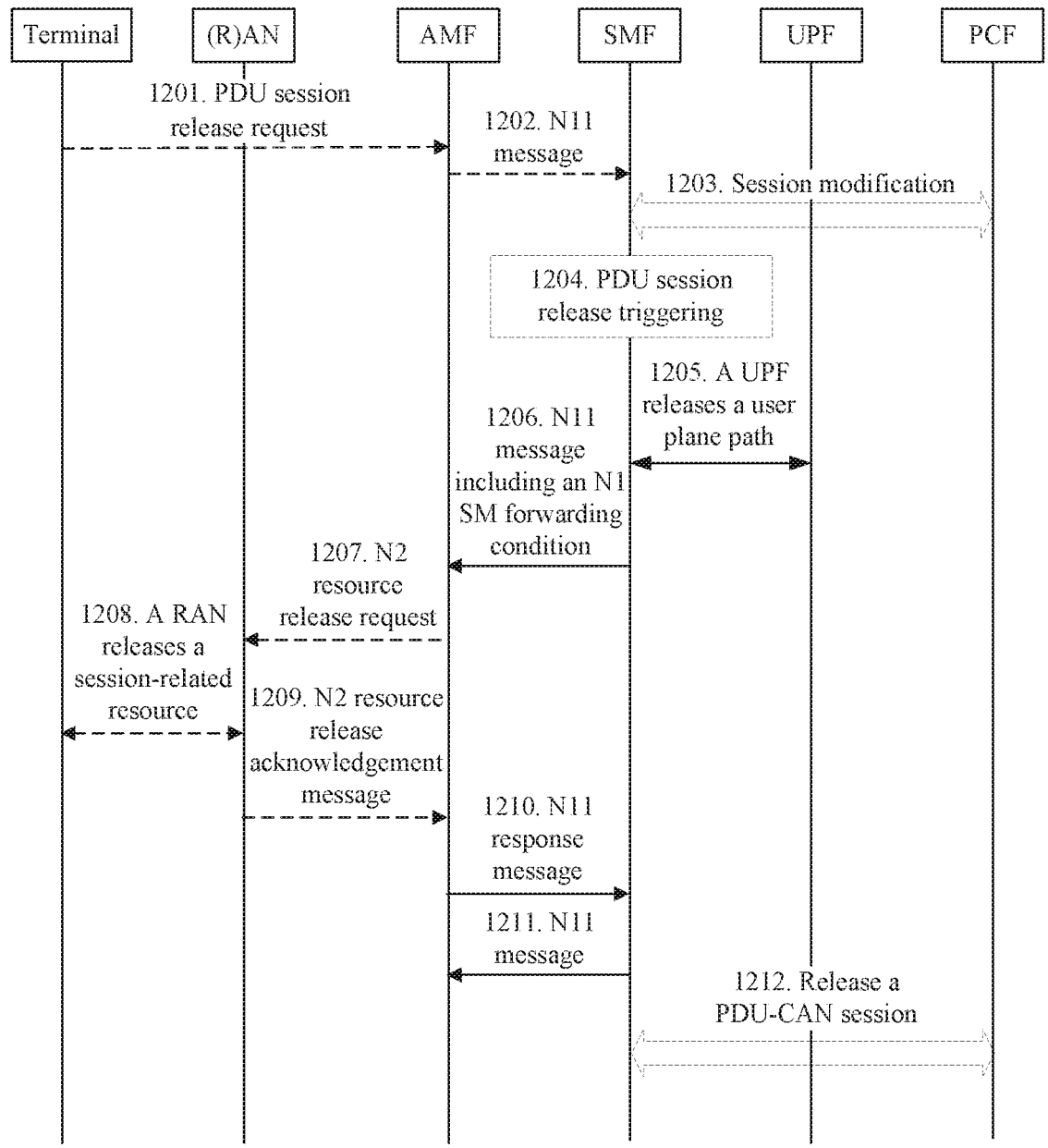
FIG. 12 is a schematic flowchart of a communication method according to an embodiment of this application.

FIG. 12 is a schematic flowchart of session release according to an embodiment of this application.

Step 1201: A terminal sends a protocol data unit (PDU) session release request to an AMF.

The request may be triggered by the terminal or a network side.

Step 1202: The AMF sends, to an SMF, an N11 message that includes the PDU session release request.

Step 1203: The SMF interacts with a PCF, and modifies a session.

Step 1204: The SMF triggers session release.

Step 1205: The SMF notifies a UPF to release a user plane path.

Step 1206: The SMF sends an N11 message to the AMF, where the N11 message may carry N1 SM forwarding condition information, namely, terminal status condition information, an N2 SM resource release request, and N1 SM information (namely, a PDU session release command), to trigger resource release on a RAN side and terminal resource release. The condition information is the terminal status condition information.

Whether the AMF is required to forward an N2 SM release message may be determined on an SMF side. For a session in an activated-state, an N2 SM message needs to be sent, to release a RAN-side resource. For a session in a non-activated-state an N2 SM message does not need to be sent because a RAN-side resource has been released. A session status is stored on the SMF, and therefore the SMF may perform determining by itself.

However, for forwarding of an N1 SM message, the message needs to further carry an N1 SM forwarding condition. The terminal status condition information herein in this embodiment of this application has the following several cases.

(1) For some sessions of the terminal in an idle state, the SMF may release a terminal-side resource of the session through implicit synchronization. In this case, indication information may be further carried. The indication information indicates that the N1 SM message may not be forwarded, for example, an "N1 SM delivery can be skipped" indication. The indication information may be independent, or may be a part of condition information. For example, the terminal status condition information is: The terminal is in an idle state and receives the indication information indicating that the N1 SM message may not be forwarded.

(2) For all sessions of the terminal in an idle state, the SMF may alternatively release terminal resources of the sessions through synchronization. In this case, indication information indicating that the N1 SM message may not be forwarded does not need to be carried. For example, the terminal status condition information is that the terminal is in an idle state.

(3) The SMF may alternatively release all non-activated-state sessions together through implicit synchronization. In this case, the SMF only needs to directly release a session context of the AMF and the SMF and a binding relationship between the AMF and the SWF, and the SMF does not send N1 SM information.

In a service-based architecture, in both case (1) and case (2), the SMF conditionally invokes an N1 SM message forwarding service of the AMF. For example, for input of an N1 message forwarding service, namely, a Namf_Communication_N1MessageTransfer service operation, provided by the AMF, a condition parameter herein needs to be added, to indicate a condition for service execution.

Step 1207: The AMF determines, based on the terminal status condition information, whether to forward the received N1 SM message, and if the AMF determines that the terminal is in the idle state.

(1) For case (1) in step 1206, the message received by the AMF carries the indication information indicating that the N1 SM message may not be forwarded. In this case, the N1 SM message is not forwarded, and step 1208 and step 1209 are skipped; the terminal-side resource is released through implicit synchronization, and step 1210 is directly performed.

(2) For case (2) in step 1206, the AMF does not forward the N1 SM message, skips step 1208 and step 1209, releases the terminal-side resource through implicit synchronization, and directly performs step 1210.

(3) In all other cases, the AMF forwards the N1 SM message, and if the terminal is in an idle state, the AMF pages the terminal through triggering an SR using a network, and further forwards the N1 SM information to the terminal. If the terminal is in a CM-connected state, the AMF directly forwards the received N1 SM message to a RAN.

In the service-based architecture, the AMF executes the N1 SM message forwarding service based on the terminal status condition information input by the SMF. The AMF executes the service when the terminal status condition information is met, or does not execute the service when the terminal status condition information is not met. After the execution is completed, the AMF returns an execution result.

N2 SM message processing is the same as that in other approaches, and includes no special processing. Details are not described herein.

Step 1208: The RAN releases a session-related resource, and forwards the N1 SM PDU session release command to the terminal, to complete terminal-side resource release.

Step 1209: When RAN-side resource release is completed, the RAN returns an N2 resource release acknowledgement message, where a terminal release response may be carried in the N2 resource release acknowledgement message for transmission.

Step 1210: The AMF sends an N11 response message, where the N11 response message carries an N2 SM resource release acknowledgement (Ack).

Step 1211: The SMF sends an N11 message to the AMF, to inform the AMF that session release is completed. The AMF and the SMF delete related session context information, including a binding relationship between the AMF and the SMF and the like.

Step 1212: A protocol data unit connectivity access network (PDU-CAN) session is released.

After the foregoing process, the SMF completes decision-making on session management information processing, and sends the N1 SM forwarding condition to the AMF. When obtaining a status of the related terminal, the AMF executes the forwarding service based on the forwarding condition that is set by the SMF.

Based on a same technical idea, the embodiments of this application further provide a communications apparatus.

Figure 13:
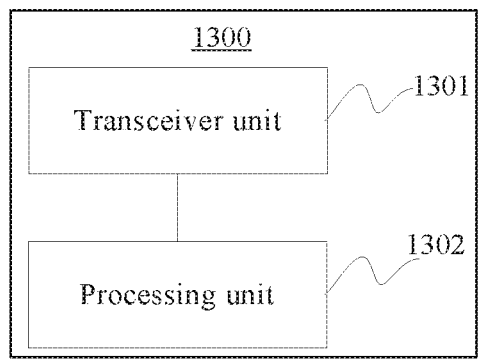
FIG. 13 is a schematic structural diagram of a communications apparatus according to an embodiment of this application.

FIG. 13 is a schematic structural diagram of a communications apparatus 1300 according to an embodiment of this application.

The communications apparatus 1300 includes: a transceiver unit 1301 configured to receive tunnel information of a first session from a mobility management network element, where the tunnel information is information about a tunnel between an access-network network element and a first user plane network element that receives downlink data for a terminal; and a processing unit 1302 configured to: determine that the tunnel information is invalid; and send first information to a session management network element, where the first information indicates that the tunnel information is invalid.

Optionally, the processing unit 1302 is configured such that when determining that the access-network network element is unable to connect to the first user plane network element corresponding to the tunnel information, the processing unit 1302 determines that the tunnel information is invalid.

Figure 14:
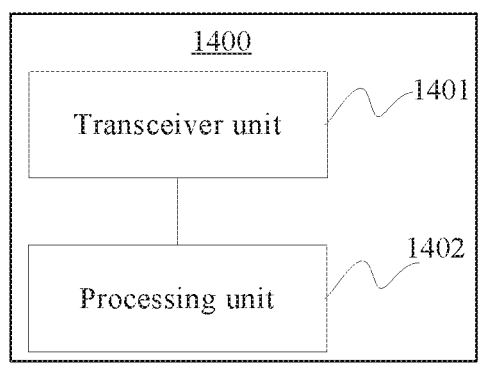
FIG. 14 is a schematic structural diagram of a communications apparatus according to an embodiment of this application.

FIG. 14 is a schematic structural diagram of a communications apparatus 1400 according to an embodiment of this application.

The communications apparatus 1400 includes: a transceiver unit configured to receive first information from an access-network network element, where the first information indicates that tunnel information of a first session is invalid, and the tunnel information is information about a tunnel between the access-network network element and a first user plane network element that receives downlink data for a terminal; and a processing unit configured to update the tunnel information of the first session after the first information is received.

Figure 15:
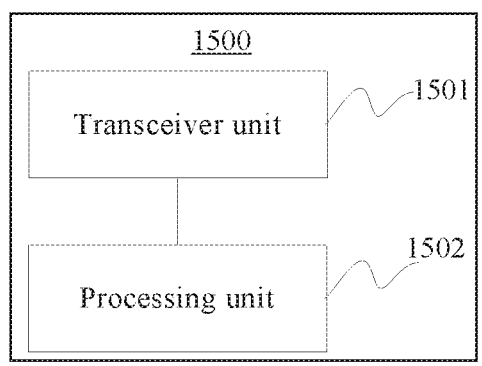
FIG. 15 is a schematic structural diagram of a communications apparatus according to an embodiment of this application.

FIG. 15 is a schematic structural diagram of a communications apparatus 1500 according to an embodiment of this application.

The communications apparatus 1500 includes: a transceiver unit 1501 configured to: receive session management information and location area information from a session management network element; and determine location information of a terminal; and a processing unit 1502 configured to determine, based on the location area information and the location information, that the terminal is located outside a service area indicated by the location area information.

The transceiver unit is configured to: notify the session management network element that the session management information is not forwarded; and trigger the session management network element to update the session management information.

Optionally, the transceiver unit is configured to: send a first message to the session management network element, where the first message indicates that the session management information is not forwarded; and trigger the session management network element to update the session management information.

Figure 16:
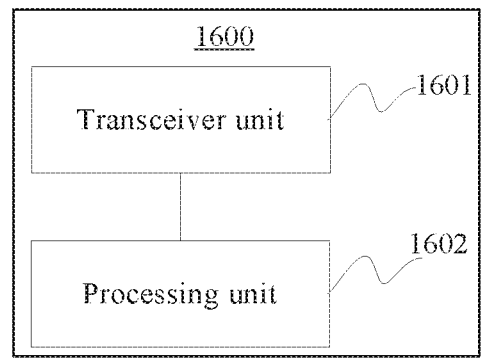
FIG. 16 is a schematic structural diagram of a communications apparatus according to an embodiment of this application.

FIG. 16 is a schematic structural diagram of a communications apparatus 1600 according to an embodiment of this application.

The communications apparatus 1600 includes: a transceiver unit 1601 configured to: send session management information and location area information to a mobility management network element; and learn from the mobility management network element that the session management information is not forwarded, where that the session management information is not forwarded is associated with the location area information and location information of a terminal; and a processing unit 1602 configured to update the session management information.

Optionally, the transceiver unit 1601 is configured to receive a first message from the mobility management network element, where the first message indicates an update of the session management information.

Optionally, the first message further includes the location information.

Optionally, the location area information includes service area information of a first user plane network element that receives downlink data for the terminal.

Optionally, updated session management information includes information about a second user plane network element for transmitting data to the terminal.

Figure 17:
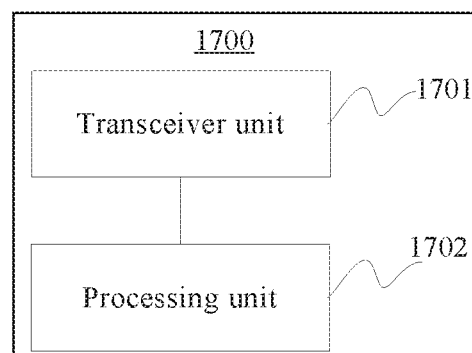
FIG. 17 is a schematic structural diagram of a communications apparatus according to an embodiment of this application.

FIG. 17 is a schematic structural diagram of a communications apparatus 1700 according to an embodiment of this application.

The communications apparatus 1700 includes: a transceiver unit 1701 configured to obtain location information of a terminal; and a processing unit 1702 configured to: determine, based on the location information, that the terminal is located outside a service area of a user plane network element corresponding to a first session of the terminal; and determine, based on the location information of the terminal, a second user plane network element for transmitting data to the terminal.

Optionally, the transceiver unit 1701 is configured to: after receiving a downlink data notification message, request the location information of the terminal from a mobility management network element; and receive, by the session management network element, the location information of the terminal from the mobility management network element.

The processing unit 1702 is configured to determine, based on the location information received from the mobility management network element, that the terminal is located outside the service area of the first user plane network element corresponding to the first session of the terminal.

Optionally, the transceiver unit 1701 is further configured to send, to the mobility management network element, session management information that includes second tunnel information corresponding to the second user plane network element.

Figure 18:
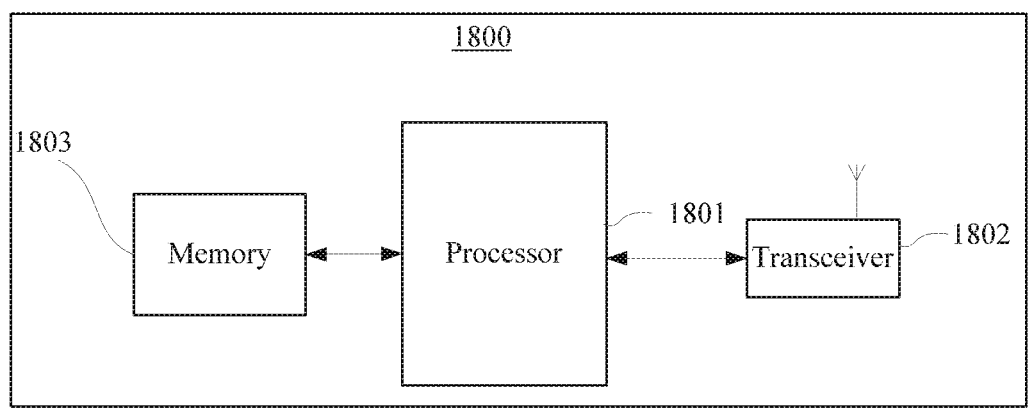
FIG. 18 is a schematic structural diagram of a communications apparatus according to an embodiment of this application.

FIG. 18 is a schematic structural diagram of a communications apparatus 1800 according to an embodiment of this application.

The communications apparatus 1800 includes: a memory 1803 configured to store a computer instruction; a processor 1801 configured to read the computer instruction in the memory 1803; and a transceiver 1802 configured to receive tunnel information of a first session from a mobility management network element, where the tunnel information is information about a tunnel between an access-network network element and a first user plane network element that receives downlink data for a terminal. The processor 1801 is further configured to: determine that the tunnel information is invalid; and send first information to a session management network element, where the first information indicates that the tunnel information is invalid.

Optionally, the processor 1801 is configured such that when determining that the access-network network element is unable to connect to the first user plane network element corresponding to the tunnel information, the processor 1801 determines that the tunnel information is invalid.

Figure 19:
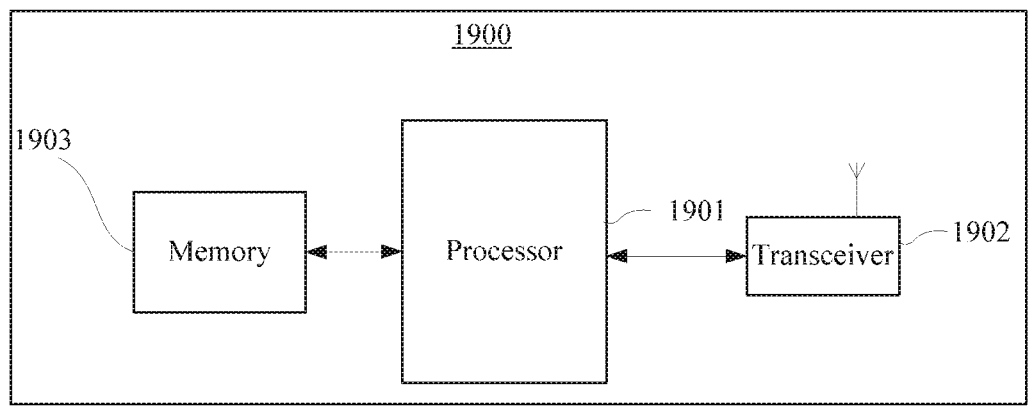
FIG. 19 is a schematic structural diagram of a communications apparatus according to an embodiment of this application.

FIG. 19 is a schematic structural diagram of a communications apparatus 1900 according to an embodiment of this application.

The communications apparatus 1900 includes: a memory 1903 configured to store a computer instruction; a processor 1901 configured to read the computer instruction in the memory 1903; and a transceiver 1902 configured to receive first information from an access-network network element, where the first information indicates that tunnel information of a first session is invalid, and the tunnel information is information about a tunnel between the access-network network element and a first user plane network element that receives downlink data for a terminal. The processor 1901 is further configured to update the tunnel information of the first session after the first information is received.

Figure 20:
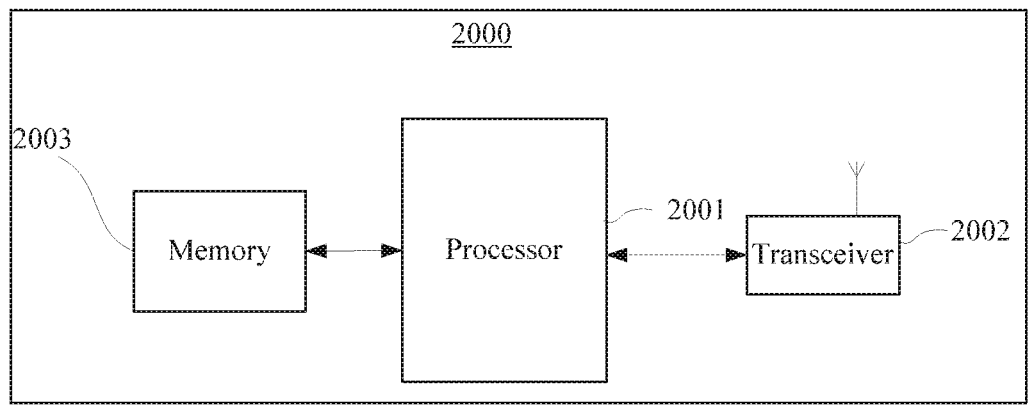
FIG. 20 is a schematic structural diagram of a communications apparatus according to an embodiment of this application.

FIG. 20 is a schematic structural diagram of a communications apparatus 2000 according to an embodiment of this application.

The communications apparatus 2000 includes: a memory 2003 configured to store a computer instruction; a processor 2001 configured to read the computer instruction in the memory 2003; and a transceiver 2002 configured to: receive session management information and location area information from a session management network element; and determine location information of a terminal. The processor 2001 is further configured to determine, based on the location area information and the location information, that the terminal is located outside a service area indicated by the location area information.

The transceiver 2002 is configured to: notify the session management network element that the session management information not forwarded; and trigger the session management network element to update the session management information.

Optionally, the transceiver is configured to: send a first message to the session management network element, where the first message indicates that the session management information is not forwarded; and trigger the session management network element to update the session management information.

Figure 21:
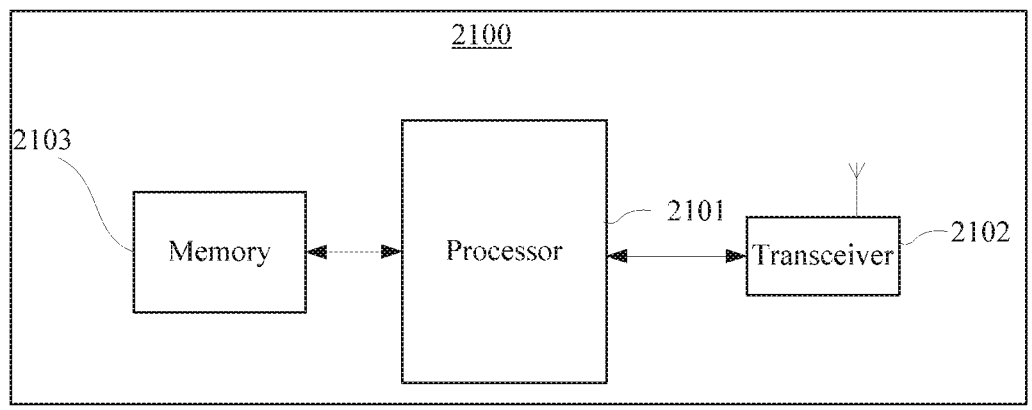
FIG. 21 is a schematic structural diagram of a communications apparatus according to an embodiment of this application.

FIG. 21 is a schematic structural diagram of a communications apparatus 2100 according to an embodiment of this application.

The communications apparatus 2100 includes: a memory 2103 configured to store a computer instruction; a processor 2101 configured to read the computer instruction in the memory 2103; and a transceiver 2102 configured to: send session management information and location area information to a mobility management network element; and learn from the mobility management network element that the session management information is not forwarded, where that the session management information is not forwarded is associated with the location area information and location information of a terminal. The processor 2101 is further configured to update the session management information.

Optionally, the transceiver 2102 is configured to receive a first message from the mobility management network element, where the first message indicates an update of the session management information.

Optionally, the first message further includes the location information.

Optionally, the location area information includes service area information of a first user plane network element that receives downlink data for the terminal.

Optionally, updated session management information includes information about a second user plane network element for transmitting data to the terminal.

Figure 22:
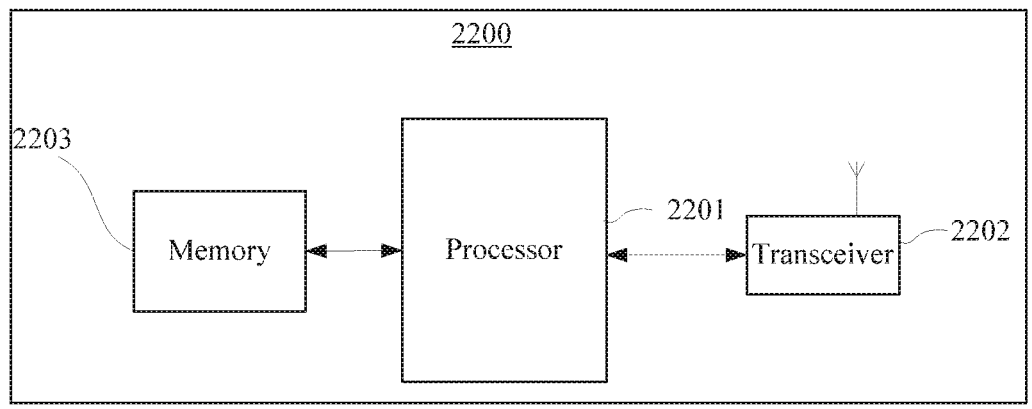
FIG. 22 is a schematic structural diagram of communications apparatus according to an embodiment of this application.

FIG. 22 is a schematic structural diagram of a communications apparatus 2200 according to an embodiment of this application.

The communications apparatus 2200 includes: a memory 2203 configured to store a computer instruction; a processor 2201 configured to read the computer instruction in the memory 2203; a transceiver 2202 configured to obtain location information of a terminal; and a processor 2201 configured to: determine, based on the location information, that the terminal is located outside a service area of a user plane network element corresponding to a first session of the terminal; and determine, based on the location information of the terminal, a second user plane network element for transmitting data to the terminal.

Optionally, the transceiver 2202 is configured to: after receiving a downlink data notification message, request the location information of the terminal from a mobility management network element; and receive, by the session management network element, the location information of the terminal from the mobility management network element.

The processor 2201 is configured to determine, based on the location information received from the mobility management network element, that the terminal is located outside the service area of the first user plane network element corresponding to the first session of the terminal.

Optionally, the transceiver 2202 is further configured to send, to the mobility management network element, session management information that includes second tunnel information corresponding to the second user plane network element.

An embodiment of this application further provides a computer-readable storage medium, configured to store a computer software instruction to be executed for execution of the foregoing processor, and the computer-readable storage medium includes a program to be executed for execution of the foregoing processor.

A person skilled in the art should understand that the embodiments of this application may be provided as a method, a system, or a computer program product. Therefore, this application may use a form of hardware-only embodiments, software-only embodiments, or embodiments with a combination of software and hardware. Moreover, this application may use a form of a computer program product that is implemented on one or more computer-usable storage media (including but not limited to a magnetic disk memory, an optical memory, and the like) that include computer-usable program code.

This application is described with reference to various flowcharts and/or the block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by the computer or the processor of any other programmable data processing device generate an apparatus for implementing a specified function in one or more processes in the flowcharts and/or in one or more blocks in the block diagrams.

These computer program instructions may alternatively be stored in a computer-readable memory that can instruct a computer or another programmable data processing device to work in a specific manner, such that the instructions stored in the computer-readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, such that a series of operations and steps are performed on the computer or the other programmable device, thereby generating computer-implemented processing. Therefore, the instructions executed on the computer or the other programmable device provide steps for implementing a specified function in one or more processes in the flowcharts and/or in one or more blocks in the block diagrams.

A person skilled in the art can make various modifications and variations to this application without departing from the spirit and scope of this application. This application is intended to cover these modifications and variations of this application provided that these modifications and variations fall within the scope of the claims of this application and equivalent technologies thereof.

What is claimed is:

1. A communication method, comprising:
    sending, by a session management device, location area information to a mobility management device;
    receiving, by the mobility management device, the location area information from the session management device;
    obtaining, by the mobility management device, location information of a terminal;
    determining, based on the location area information and the location information, that the terminal is located outside a service area indicated by the location area information;
    receiving, by the mobility management device, session management information from the session management device;
    in response to the determination, sending, by the mobility management device to the session management device, a message for an update of the session management information; and
    determining, by the mobility management device, not to send the session management information to a radio access network device in response to the mobility management device determining that the terminal is located outside the service area indicated by the location area information.

2. The communication method according to claim 1, further comprising determining, by the session management device in response to the message, to update the session management information according to a condition, wherein the condition comprises that the terminal is located outside a service area of a first user plane device for the terminal.

3. The communication method according to claim 1, wherein updated session management information comprises information about a second user plane device selected by the session management device for transmitting data to the terminal.

4. The communication method according to claim 1, wherein the message comprises the location information of the terminal.

5. The communication method according to claim 1, wherein the session management information comprises N2 session management (SM) information.

6. The communication method according to claim 1, wherein the location area information indicates a service area of a user plane device that receives downlink data for the terminal.

7. The communication method according to claim 1, wherein obtaining the location information of the terminal comprises obtaining the location information of the terminal from a service request message from the terminal.

8. The communication method according to claim 1, further comprising notifying, by the mobility management device, the session management device that the session management information is not forwarded.

9. The communication method according to claim 1, wherein the message further notifies the session management device that the session management information is not forwarded.

10. The communication method according to claim 1, wherein the mobility management device comprises an access and mobility management function (AMF), and wherein the session management device comprises a session management function (SMF).

11. A communication system, comprising:
    a session management device configured to send location area information; and
    a mobility management device configured to:
        receive the location area information from the session management device;
        obtain location information of a terminal; determine, based on the location area information and the location information, that the terminal is located outside a service area indicated by the location area information;
        receive session management information from the session management device;
        in response to the determination, send, to the session management device, a message for update of the session management information; and
    determine not to send the session management information to a radio access network device in response to the mobility management device determining that the terminal is located outside the service area indicated by the location area information.

12. The communication system according to claim 11, the session management device is further configured to determine, in response to the message, to update the session management information according to a condition, wherein the condition comprises that the terminal is located outside a service area of a first user plane device for the terminal.

13. The communication system according to claim 11, wherein updated session management information comprises information about a second user plane device selected by the session management device for transmitting data to the terminal.

14. The communication system according to claim 11, wherein the message comprises the location information of the terminal.

15. The communication system according to claim 11, wherein the session management information comprises N2 session management (SM) information.

16. The communication system according to claim 11, wherein the location area information indicates a service area of a user plane device that receives downlink data for the terminal.

17. The communication system according to claim 11, wherein the mobility management device is configured to obtain the location information of the terminal from a service request message from the terminal.

18. The communication system according to claim 11, wherein the mobility management device further notifies the session management device that the session management information is not forwarded.

19. The communication system according to claim 11, wherein the message further notifies the session management device that the session management information is not forwarded.

20. The communication system according to claim 11, wherein the mobility management device comprises an access and mobility management function (AMF), and wherein the session management device comprises a session management function (SMF).

* * * * *